(12) United States Patent
Zichao et al.

(10) Patent No.: US 11,595,394 B2
(45) Date of Patent: Feb. 28, 2023

(54) INFORMATION PROCESSING SYSTEM, APPARATUS, AND METHOD FOR SETTING A ROLE IN AN APPLICATION PACKAGE

(71) Applicant: Ricoh Company, Ltd., Tokyo (JP)

(72) Inventors: Xu Zichao, Kanagawa (JP); Hiroki Uchibori, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 196 days.

(21) Appl. No.: 17/088,978

(22) Filed: Nov. 4, 2020

(65) Prior Publication Data

US 2021/0136074 A1 May 6, 2021

(30) Foreign Application Priority Data

Nov. 6, 2019 (JP) .............................. JP2019-201773

(51) Int. Cl.
*H04L 9/40* (2022.01)
*H04L 67/125* (2022.01)
*G06F 21/10* (2013.01)

(52) U.S. Cl.
CPC ............ *H04L 63/101* (2013.01); *G06F 21/10* (2013.01); *G06F 21/105* (2013.01); *H04L 63/083* (2013.01); *H04L 67/125* (2013.01); *G06F 2221/0713* (2013.01)

(58) Field of Classification Search
CPC ... H04L 63/101; H04L 63/083; H04L 67/125; G06F 21/10; G06F 21/105; G06F 21/45; G06F 21/604; G06F 21/629; G06G 8/60
See application file for complete search history.

(56) References Cited

U.S. PATENT DOCUMENTS

| | | | |
|---|---|---|---|
| 8,725,645 B1* | 5/2014 | Montini | G06F 21/125 705/52 |
| 8,982,377 B2 | 3/2015 | Uchibori et al. | |
| 9,491,326 B2 | 11/2016 | Uchibori | |
| 9,948,810 B2 | 4/2018 | Uchibori et al. | |
| 10,003,710 B2 | 6/2018 | Uchibori | |
| 10,306,080 B2 | 5/2019 | Uchibori et al. | |
| 10,511,737 B2 | 12/2019 | Uchibori | |
| 10,587,718 B2 | 3/2020 | Uchibori et al. | |
| 2006/0190408 A1* | 8/2006 | Cook | G06Q 30/06 705/59 |
| 2008/0163199 A1* | 7/2008 | Rao | G06F 8/61 717/177 |

(Continued)

FOREIGN PATENT DOCUMENTS

| | | |
|---|---|---|
| JP | 2008-233947 | 10/2008 |
| JP | 2017-120502 | 7/2017 |

OTHER PUBLICATIONS

Extended European Search Report for 20205350.0 dated Mar. 29, 2021.

*Primary Examiner* — Robert B Leung
(74) *Attorney, Agent, or Firm* — IPUSA, PLLC

(57) ABSTRACT

At least one information processing apparatus includes a circuitry that: receives, as a package management unit, a setting of a role, which can assign a usage authority of an application package containing at least one application, with respect to the application package, and permits or restricts, as a user management unit, a user to use the application package in conformity with the role, which is allocated to the user of the application, and the role, which is set in the application package.

14 Claims, 26 Drawing Sheets

(56) References Cited

U.S. PATENT DOCUMENTS

| | | |
|---|---|---|
| 2008/0229327 A1 | 9/2008 | Yoshida |
| 2012/0127525 A1 | 5/2012 | Uchibori et al. |
| 2012/0127527 A1 | 5/2012 | Nakabayashi et al. |
| 2012/0317621 A1 | 12/2012 | Mihara |
| 2013/0314732 A1 | 11/2013 | Nakabayashi et al. |
| 2016/0132808 A1* | 5/2016 | To ................... G06Q 10/06315 705/7.25 |
| 2016/0344771 A1* | 11/2016 | Xuan ...................... H04L 63/10 |
| 2018/0268124 A1 | 9/2018 | Ohzaki et al. |
| 2019/0095594 A1 | 3/2019 | Uchibori |
| 2019/0188362 A1 | 6/2019 | Uchibori |
| 2020/0084198 A1* | 3/2020 | Inoue ................... H04L 63/102 |
| 2020/0097233 A1* | 3/2020 | Ueda .................... H04L 63/102 |
| 2020/0204644 A1 | 6/2020 | Uchibori et al. |

* cited by examiner

FIG.11

| | | | |
|---|---|---|---|
| \< RETURN TO HOME | | OPERATION TOOL | END USER TEAM ▼ |

👤 CUSTOMER LIST

PLEASE SELECT ARE CUSTOMER TO BE EDITED

SEARCH CONDITION

CUSTOMER NAME [_____221_____]  TENANT ID [_____222_____]

REGISTRATION DATE  From: [📅] ~ To: [📅]   STATE [SERVICE IS BEING PROVIDED ▼]
              ⎵_____223_____⎵         224  [SEARCH] [CLEARING SEARCH]

[OK]

NUMBER OF MATCHES: 49

| CUSTOMER NAME | TENANT ID | STATE | REGISTRATION DATE |
|---|---|---|---|
| ☐ COMPANY A | t-e-e2ersi | SERVICE IS BEING PROVIDED | 2016/04/01 |
| ☐ COMPANY B | t-e-e2ersint | SERVICE IS BEING PROVIDED | 2016/04/01 |
| ☐ OFFICE A | t-endu-e2e | SERVICE IS BEING PROVIDED | 2016/04/01 |
| ☐ OFFICE B | t-endu-e2ent | SERVICE IS BEING PROVIDED | 2016/04/01 |
| ☐ OFFICE C | t-enduser | SERVICE IS BEING PROVIDED | 2016/04/01 |
| ☐ AUTONOMY A | t-enduser-nt | SERVICE IS BEING PROVIDED | 2019/06/13 |
| ☐ AUTONOMY B | 5143151643 | SERVICE IS BEING PROVIDED | 2019/06/13 |
| ☐ AUTONOMY C | 2149296379 | SERVICE IS BEING PROVIDED | 2019/06/13 |
| ☐ TEST TENANT | 4150418755 | SERVICE IS BEING PROVIDED | 2018/09/18 |

220, 225

USER REGISTRATION

USER REGISTRATION MAIL IS SENT — 271
IT BECOMES USABLE AFTER USER COMPLETES LOGIN INFORMATION REGISTRATION IN CONFORMITY WITH MAIL

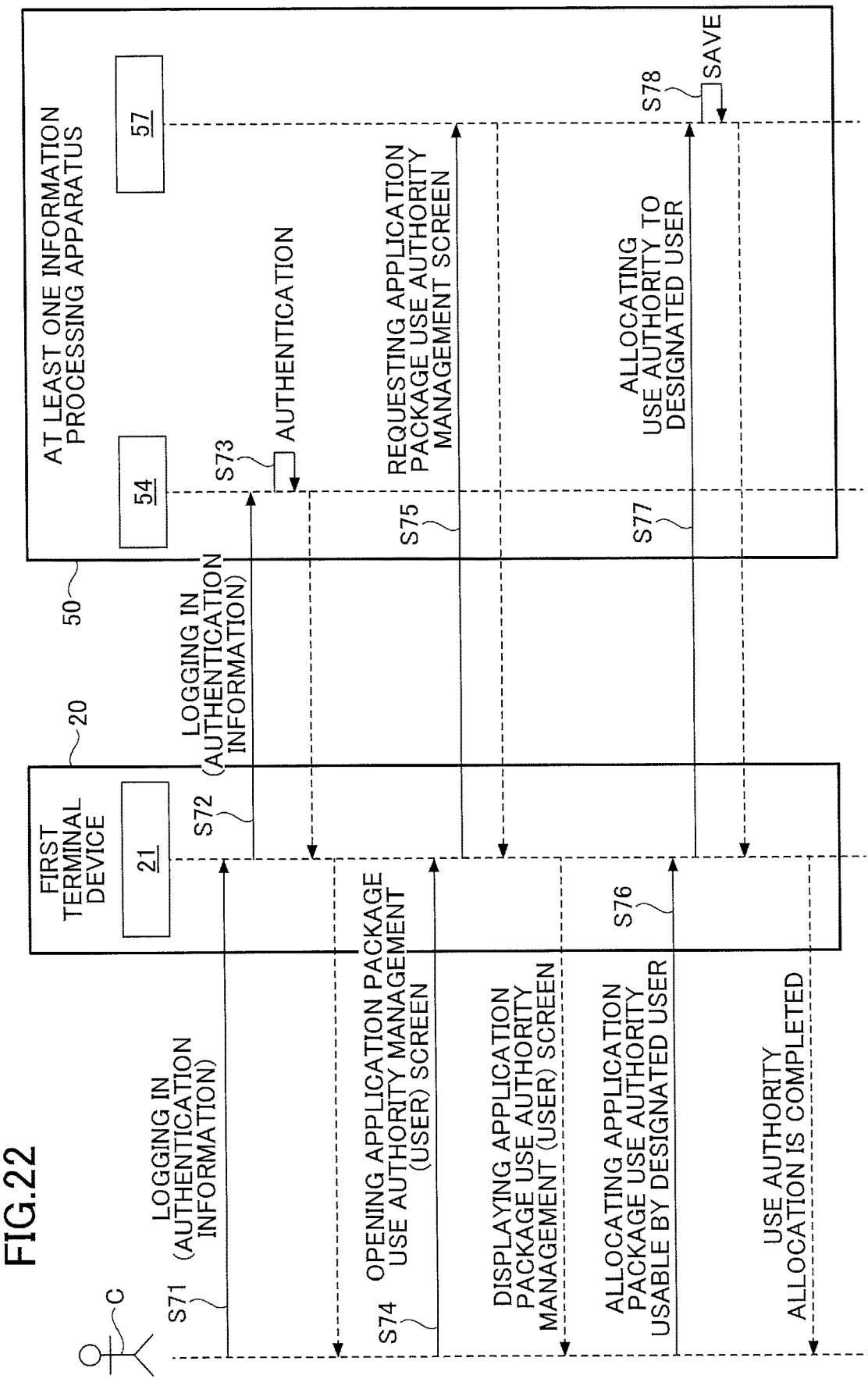

FIG.23

| Sample | Permission Management (User) | | | | | user01<br>TENANT ID: 0123456789 |
|---|---|---|---|---|---|---|

← Top
|APPLICATION USAGE AUTHORITY MANAGEMENT (USER)
IN ORDER TO CHANGE USE AUTHORITY, ✎ PLEASE DEPRESS ✔ TO SWITCH OVER
BETWEEN ON AND OFF.

◁ 1-5/20 APPLICATION ▲▼

| USER ID | APPLICATION 1 | APPLICATION 2 | APPLICATION 3 | APPLICATION 4 | APPLICATION 5 |
|---|---|---|---|---|---|
| REGISTRATION USER NUMBER OF 20 | ✎ 2/20 | ✎ 4/30 (SETTING) | ✎ 0/30 | ✎ 10/30 | ✎ 0/30 |
| admin(MANAGER) | | ✔ | ✔ | ✔ | ✔ |
| hanako(SATOH HANAKO) | ✔ | ✔ | | ✔ | ✔ |
| taro(SATOH TAROU) | ✔ | ✔ | | ✔ | ✔ |
| user01XXXX(aaaXXX bbbXXX) | — | ✔ | — | ✔ | ✔ |
| user01XXXX(aaaXXX bbbXXX) | — | ✔ | — | ✔ | ✔ |
| user01XXXX(aaaXXX bbbXXX) | — | — | — | ✔ | ✔ |
| user01XXXX(aaaXXX bbbXXX) | — | — | — | ✔ | ✔ |
| user01XXXX(aaaXXX bbbXXX) | — | — | — | ✔ | ✔ |
| user01XXXX(aaaXXX bbbXXX) | — | — | — | ✔ | ✔ |

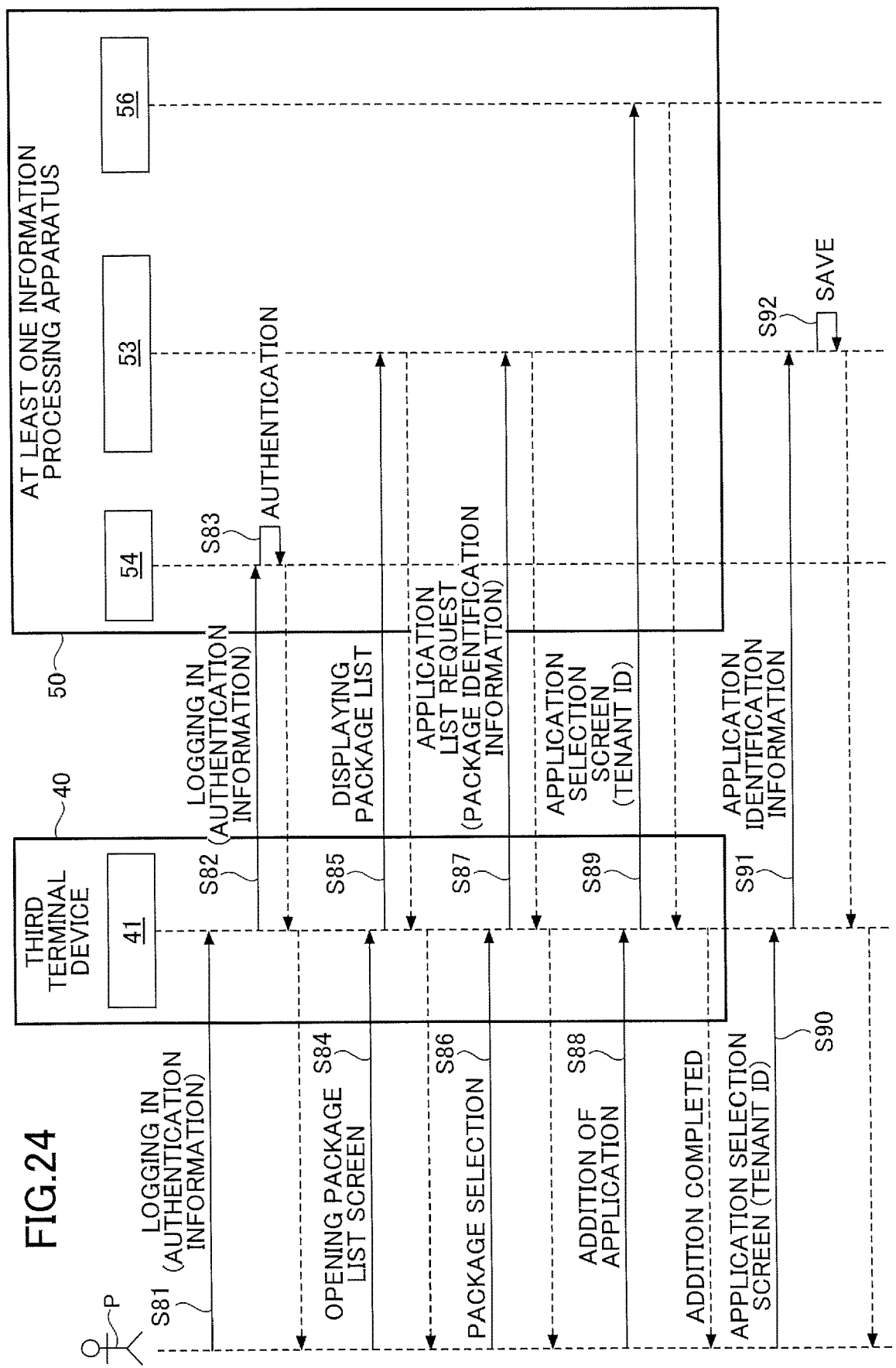

FIG.26

OPERATION TOOL — END USER TEAM ▼

< RETURNING TO WORKFLOW APPLICATION INFORMATION

▶ PACKAGE SETTING > WORKFLOW APPLICATION SETTING

WORKFLOW APPLICATION SELECTION

PLEASE DEPRESS [OK] AFTER SELECTING APPLICATION REQUIRED TO BE INCLUDED IN PACKAGE

PLEASE SET SEARCH CONDITION

APPLICATION NAME [ 211 ]   STATE [ 212 ▼ ]   SEARCH  CLEARING SEARCH

NUMBER OF MATCHES: 36   OK  RETURN

| ICON | APPLICATION NAME ▲ | EXPLANATION | APPLICATION TYPE ❓ | STATE | CREATION DATE |
|---|---|---|---|---|---|
| ☐ 🅘 | APPLICATION 1 | | | USABLE | 2019/02/05 |
| ☐ 🖨 | Guest Print(Development) | Guest Print | SHARED | USABLE | 2019/09/06 |
| ☐ 🖨 | Job Print(pcl EU) | Job Print(pcl EU) | SHARED | USABLE | 2019/09/06 |
| ☐ 🖨 | Job Print(pcl NA) | Job Print(pcl NA) | INDIVIDUAL | USABLE | 2019/09/06 |
| ☐ 🖨 | Job Print(rpcs) | Job Print(rpcs) | INDIVIDUAL | USABLE | 2019/09/06 |

{ 213 }

380

INFORMATION PROCESSING SYSTEM, APPARATUS, AND METHOD FOR SETTING A ROLE IN AN APPLICATION PACKAGE

CROSS-REFERENCE TO RELATED APPLICATIONS

The present application claims priority under 35 U.S.C. § 119 to Japanese Patent Application No. 2019-201773, filed Nov. 6, 2019. The contents of which are incorporated herein by reference in their entirety.

BACKGROUND OF THE INVENTION

1. Field of the Invention

The present invention relates to at least one information processing apparatus, an information processing system, and a role setting method.

2. Description of the Related Art

At least one information processing apparatus, in which provide software or the like to the user over a network, is known. By preparing a certain environment including a terminal device, such as a PC (personal computer) or an electronic apparatus, and a web browser operated by the terminal device, a user can use the service provided by the web application or the like provided by the information processing apparatus from the terminal device.

In some cases, the service provided by at least one of these information processing apparatuses is contracted by a company, etc. as an organization, and the affiliates, etc. of the organization use the service as a user. The organization that has contracted for the service is managed in a unit called a tenant. In order for a user (an employee of a company, etc.) to use the service, he or she needs to be registered with the tenant, for example, a manager may register the user with the tenant. In addition, a technique for registering an electronic apparatus as the tenant is known (see, for example, Japanese Laid-Open Patent Application No. 2017-120502). Japanese Laid-Open Patent Application No. 2017-120502 discloses a registration method in which a device requests an access management server to register a client based on the first authentication information possessed by a cooperation application.

SUMMARY OF THE INVENTION

There is provided at least one information processing apparatus including a circuitry that: receives, as a package management unit, a setting of a role, which can assign a usage authority of an application package containing at least one application, with respect to the application package, and permits or restricts, as a user management unit, a user to use the application package in conformity with the role, which is allocated to the user of the application, and the role, which is set in the application package.

BRIEF DESCRIPTION OF THE DRAWINGS

FIG. 11 illustrates an example of a tenant list screen.

FIG. 18 is a sequence diagram explaining the process and operation at a time when the user logs in.

FIG. 22 is an example of a sequence diagram illustrating the process of assigning an application package to a registered user by a tenant manager.

FIG. 23 illustrates an example of an application package usage authority management screen.

FIG. 24 is an example of a sequence diagram illustrating the process by the product designer of adding the application to an application package.

FIG. 26 illustrates an example of an example of an application selection screen.

DETAILED DESCRIPTION OF THE PREFERRED EMBODIMENTS

The related art has suffered from a problem that a role cannot be set in an application package. An application package is at least one application sold by a service provider as a set to the tenant. Because a service provider and a user cannot set a role in the application package, for example, the user who does not want to use the application package may be assigned the right to use the application package.

It is an object of the present invention to provide at least one information processing apparatus capable of setting a role in an application package in view of the above-described object.

Hereinafter, as an example of an embodiment of the present invention, an information processing system and a role setting method performed by the information processing system will be described.

<Outline of Operation>

Figure 1:
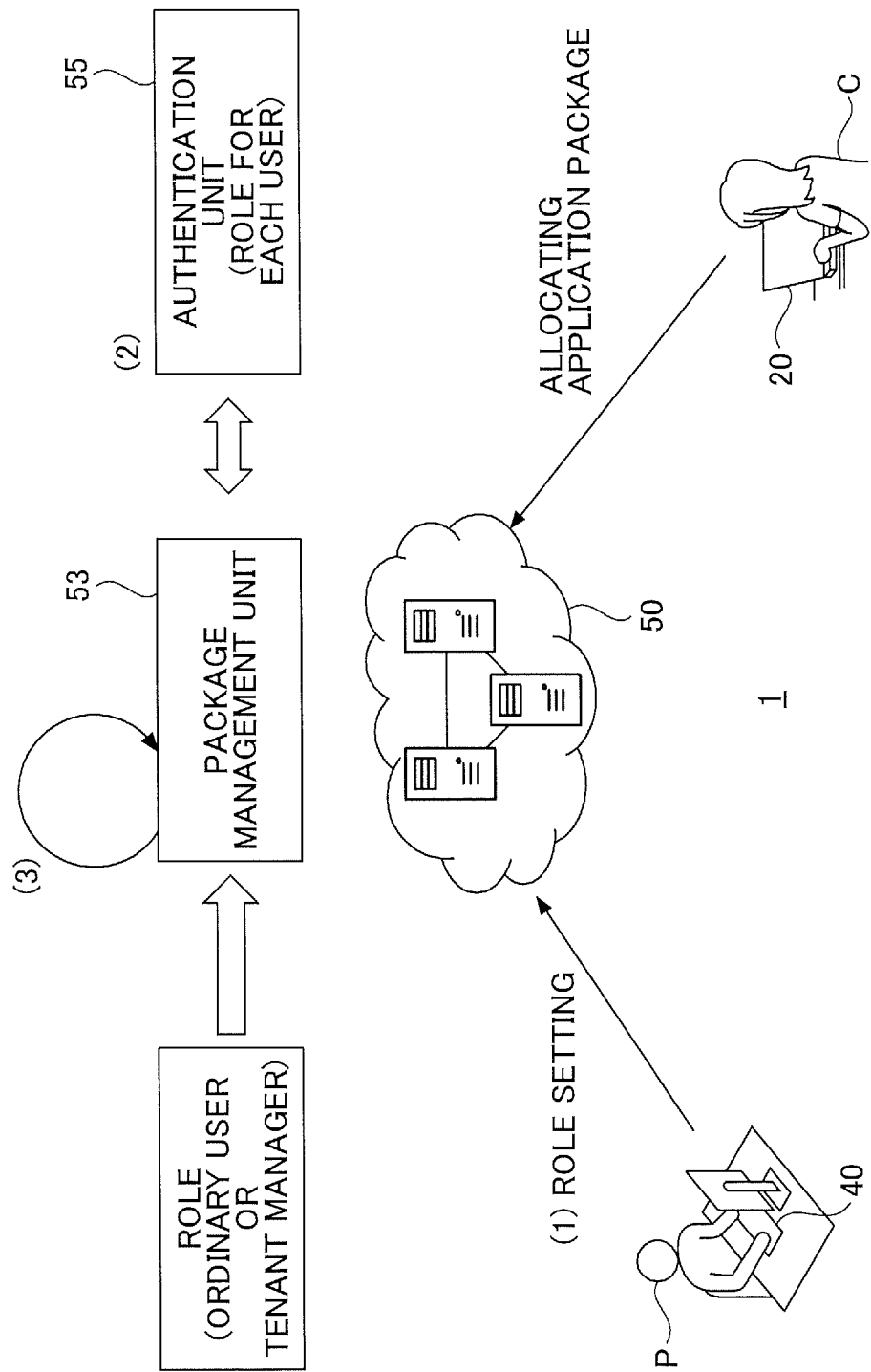
FIG. 1 illustrates a setting of a role in an application package and an allocation of an application package to a user.

First, an outline of the operation performed by the information processing system 1 will be described with reference to FIG. 1. FIG. 1 is a diagram illustrating the outline of a role setting for an application package and an assignment of an application package to a user. First, in the information processing system 1, the usage authority to use the application and the application package is determined by the role. In this embodiment, there is a role as follows.

Tenant manager C is a person who manages the use of services by users, tenant managers, etc. in a customer environment within a scope of a contract between a company and a service provider.

A person in charge at the tenant side is the main person.

For example, the ordinary user is registered with the tenant, the account state of the ordinary user is managed, and the service available to the ordinary user is registered.

The ordinary user: a user who can use a service when a usage authority is assigned.

Although, in the present embodiment, the function of a product designer P is also present, it is distinguished from a role. the product designer P is a person who creates the application package. Product designer is mainly a person in charge of the service provider. In this embodiment, the role is registered in the application package. In addition, there may be a manager who manages the usage authority of each user of the application or a contract manager who manages the contract of the application package. These multiple roles can be configured to be set in the service provider environment and to be subjected to a limited use in the customer environment as described below.

(1) In the service provider environment, the product designer P sets a role (ordinary user or tenant manager C) for using this application package. The at least one information processing apparatus 50 includes a package management unit 53 for managing an application package, and a role of the application package is set in the package management unit 53.

(2) Meanwhile, in the customer environment, the tenant manager C can register the user belonging to the tenant, and a role (an ordinary user, tenant manager C, or the like) is set for each user in the user management unit 55 of the at least one information processing apparatus 50.

(3) When the tenant manager C allocates the application package to each user, the at least one information processing apparatus 50 acquires the user's role from the user management unit 55 and extracts the application package having the same role as that of the user from the package management unit 53. Since the at least one information processing apparatus 50 provides only the application package that conforms to the user's role for the tenant manager C, the tenant manager C can assign the usage authority for using the application package only to the user having the role set in the application package. Therefore, the user can be allowed to use or restricted to use the application package.

As described above, the information processing system 1 according to the present embodiment can prevent the product designer P from setting a role in the application package and assigning the right to use the application package to a user who is not desired to be used by the tenant manager C.

<Terminology>

The tenant means information indicating multiple customers who share the same software, i.e., a company which is a group of customers. The application package contracted by the tenant can be used by each user within the tenant, and the tenant manager or the like of the tenant can give to the user the usage authority for using multiple software instances (the application package and each application within the application) within the system.

An application is a program executed by a terminal device and an information processing apparatus in order for a user to enjoy the service. A program executed in cooperation between the terminal device and the information processing apparatus is called a web application. For example, the application may be a workflow application that executes a series of processes in sequence. The application can be constructed by combining components by tenant manager C or the like. For example, a combination of document reading components, cloud sending components, and the like can be used to construct the application that uploads and stores a document read by an electronic apparatus to storage on a cloud.

An application package is at least one application sold in a set. The application included in the set may be one, but it is sold collectively as the application that is often used in the business or relevant in the business for the sake of user convenience.

The application package is a function within the tenant. The role is entitled to the right according to the role. For example, the tenant manager determines how to use the user's job type, job title, and application. Not only does the user's role coincide with the role of the application package, but if the user's role is greater than that of the application package, the user can be assigned the usage authority to use the application package.

<Example of System Structure>

Figure 2:
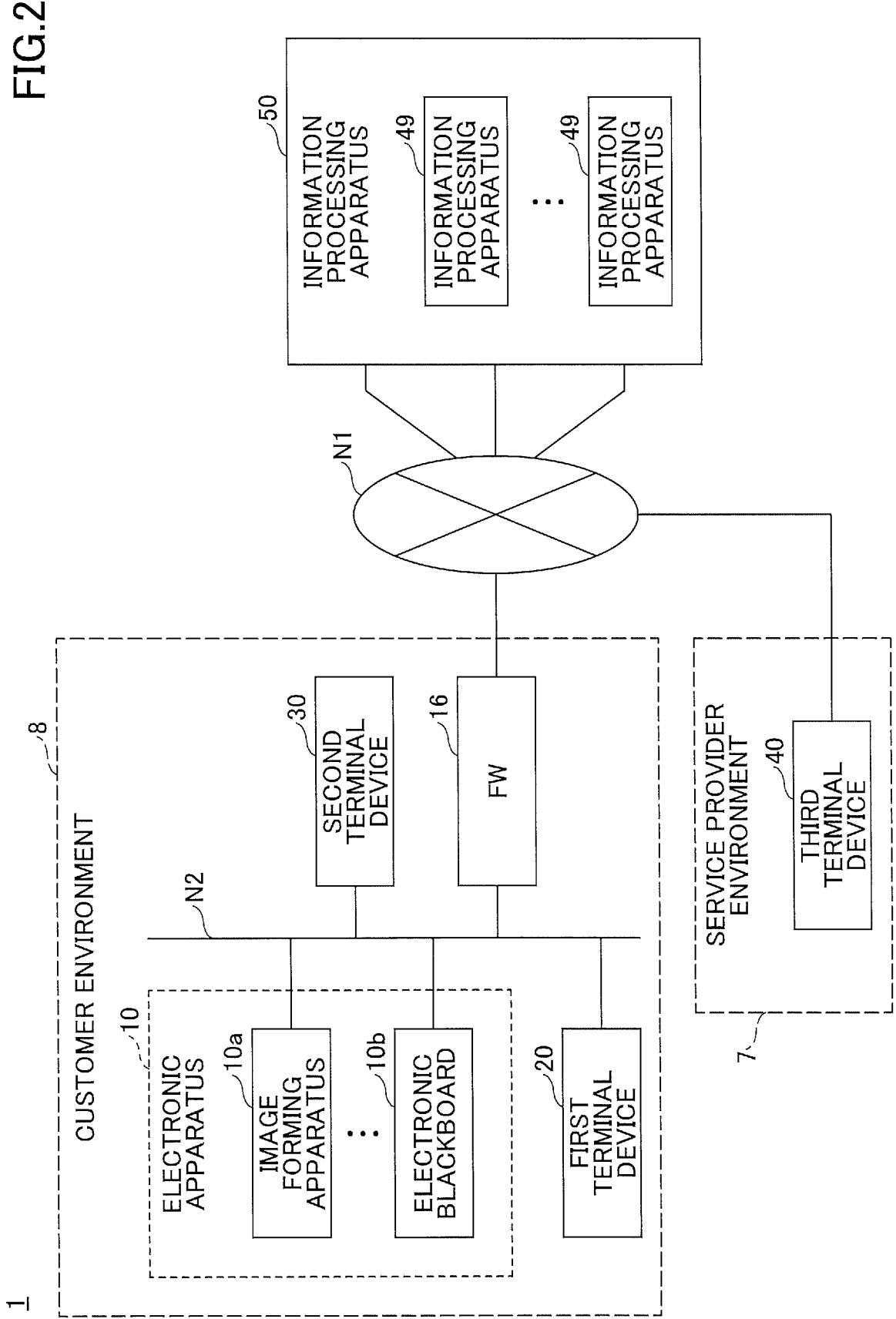
FIG. 2 illustrates an example of a configuration of an information processing system.

FIG. 2 is a structural diagram of an example of an information processing system 1 according to the present embodiment. In the information processing system 1 of FIG. 2, the customer environment 8 and the service provider environment 7 are connected to At least one information processing apparatus 50 through the network N1, such as the Internet. Network N1 also includes telephone lines such as cellular networks.

The customer is a customer of a service provided by at least one information processing apparatus 50, including an organization such as a company, organizations, educational institution, government agency, and department. The user is who has some kind of employment relationship with the customer. In the customer environment 8, at least one electronic apparatus 10, a first terminal device 20, a second terminal device 30, and a firewall 16 are connected via a network N2 such as a LAN. The at least one information processing apparatus 50 includes at least one information processing apparatus connected to the network N1. The service provider is a vendor for providing a service to the customer. A third terminal device 40 is present in the service provider environment 7.

For example, the electronic apparatus 10 is the image forming apparatus 10a. However, the image forming apparatus 10a includes a laser printer, a multifunction printer, and a MFP (Multifunction Peripheral/Product/Printer). The electronic apparatus 10 also includes an electronic blackboard 10b. Alternatively, the electronic apparatus 10 may be, for example, an output device such as a PJ (Projector), digital signage, HUD (Head Up Display) device, industrial machine, imaging device, sound collector, medical device, network home appliance, automobile (Connected Car), notebook PC, cellular phone, smartphone, tablet terminal, game machine, PDA (Personal Digital Assistant), digital camera, a wearable PC, or desktop PC.

The electronic apparatus 10 according to the present embodiment is a terminal in which a user registered in at least one information processing apparatus 50 uses the service. The user logs in at least one information processing apparatus 50 from the electronic apparatus 10, selects an application (application software) having the usage authority of use, and receives the service provided by at least one information processing apparatus 50. In this way, the service is provided per application.

The first terminal device 20 is an information processing apparatus such as a smartphone, mobile phone, tablet PC, desktop PC, notebook PC, or the like used by the tenant manager C. The first terminal device 20 includes a program having a screen display function such as a web browser. This program is not limited to a web browser only if it has a function for displaying screen information received from the information processing apparatus as a screen. The program may be dedicated to the at least one information processing apparatus 50.

The second terminal device 30 is the information processing apparatus such as a smartphone, mobile phone, tablet PC, desktop PC, notebook PC, or the like used by the user. The second terminal device 30 includes a program having a screen display function such as the web browser. This program is not limited to web browser only if it has a function for displaying screen information received from the information processing apparatus as a screen. The at least one program may be dedicated to the information processing apparatus 50.

The third terminal device 40 is the information processing apparatus such as a smartphone, mobile phone, tablet PC, desktop PC, notebook PC, or the like used by the product designer P. The third terminal device 40 includes a program having a screen display function such as the web browser. This program is not limited to the web browser only if it has a function for displaying screen information received from the information processing apparatus as a screen. The at least one program may be dedicated to the at least one information processing apparatus 50.

The firewall 16 is a device to prevent external entry into the customer environment 8, and all communications from the customer environment 8 are monitored by the firewall 16. However, this shall not apply to a case where the first terminal device 20, the second terminal device 30, or the third terminal device 40 communicates with at least one information processing apparatus 50 via a telephone line such as a cellular telephone network.

The at least one information processing apparatus 50 provides various services to the electronic apparatus 10 and the second terminal device 30 or the like. The service varies depending on the type of electronic apparatus 10. However, in the case of the image forming apparatus 10a, the service includes, but is not limited to, a service for uploading and storing the read document to the storage on the cloud and a service for downloading and printing the image data of the storage on the cloud. In the case of the electronic blackboard 10b, for example, there is a service for creating a minute by recognizing speech in real time or a service for textualizing handwritten data. In the case of the second terminal device 30, for example, there is a real-time translation service for a web page.

In at least one information processing apparatus 50, a tenant is associated with a user. A service (application) that can be used is determined in accordance with the role of the user, and the user uses the application that can be used by the user from the electronic apparatus 10 or the second terminal device 30. In addition, the tenant, tenant manager C, and user have the following relationships.

1 customer→1 tenant (tenant manager C and user belong to one tenant)

One customer→multiple tenants (Tenant manager C does not necessarily belong to the tenant, and manages each tenant and the user who belongs to each tenant. The user belongs to at least one tenant).

In either case, since at least one user registered in the information processing apparatus 50 belong to any tenant, the tenant to which the user belongs is specified after registration. In the case of one customer→one tenant, the tenant manager C logs in to the tenant and automatically determines the tenant (without specifying the tenant). In the case of one customer→multiple tenants, tenant manager C may designate a tenant at the time of login (or have different accounts for each tenant).

The at least one information processing apparatus 50 creates and sends screen information of the first terminal apparatus 20, the second terminal device 30, the third terminal device 40, or a web page displayed on the electronic apparatus 10.

For example, the package new creation screen, the user information registration screen, the package allocation screen, and the login screen are displayed as described below.

The screen information is prepared by HTML, XML, CSS (Cascade Style Sheet) and JavaScript ("JavaScript" is a registered trademark). The web page may be provided by the web application. The web app refers to software or a mechanism for running on a web browser by coordinating a program in a programming language (e.g., JavaScript ("JavaScript" is a registered trademark)) running on a web browser with a program running on a web server. The web page can be changed dynamically by the web application.

The at least one information processing apparatus 50 may be compatible with cloud computing. The cloud computing is a form of use in which a resource on a network is used without considering a specific hardware resource. The at least one information processing apparatus 50 that supports the cloud computing may be referred to as a cloud system. The cloud system may be on the Internet or on-premises.

Further, the structure of the information processing system 1 illustrated in FIG. 2 is an example, and at least one server device (such as a proxy server and a gateway server) may be interposed between the customer environment and the information processing apparatus. The first terminal device 20 and the second terminal device 30 may be present in other than the customer environment, for example, that connected to the network N1. The third terminal device 40 may be present in other than the service provider environment and may be connected to the network N1, for example.

The at least one information processing apparatus 50 may be implemented by one information processing apparatus 49 or may be implemented by distributing among a plurality of information processing apparatus 49. For example, there may be the information processing apparatus 49 that provides this for each service, or one information processing apparatus 49 may provide a plurality of services, or one service may be provided by a plurality of information processing apparatuses 49.

Further, in the information processing system 1 of FIG. 2, the information processing apparatus is connected to the network N1 such as the Internet outside the customer environment. In other words, the information processing system 1 of FIG. 2 is an example in which the at least one information processing apparatus 50 is provided in a cloud environment. However, the at least one information processing apparatus 50 may be provided inside the customer environment (on-premise environment).

<Example of Hardware Structure>
<<Computer>>

Figure 3:
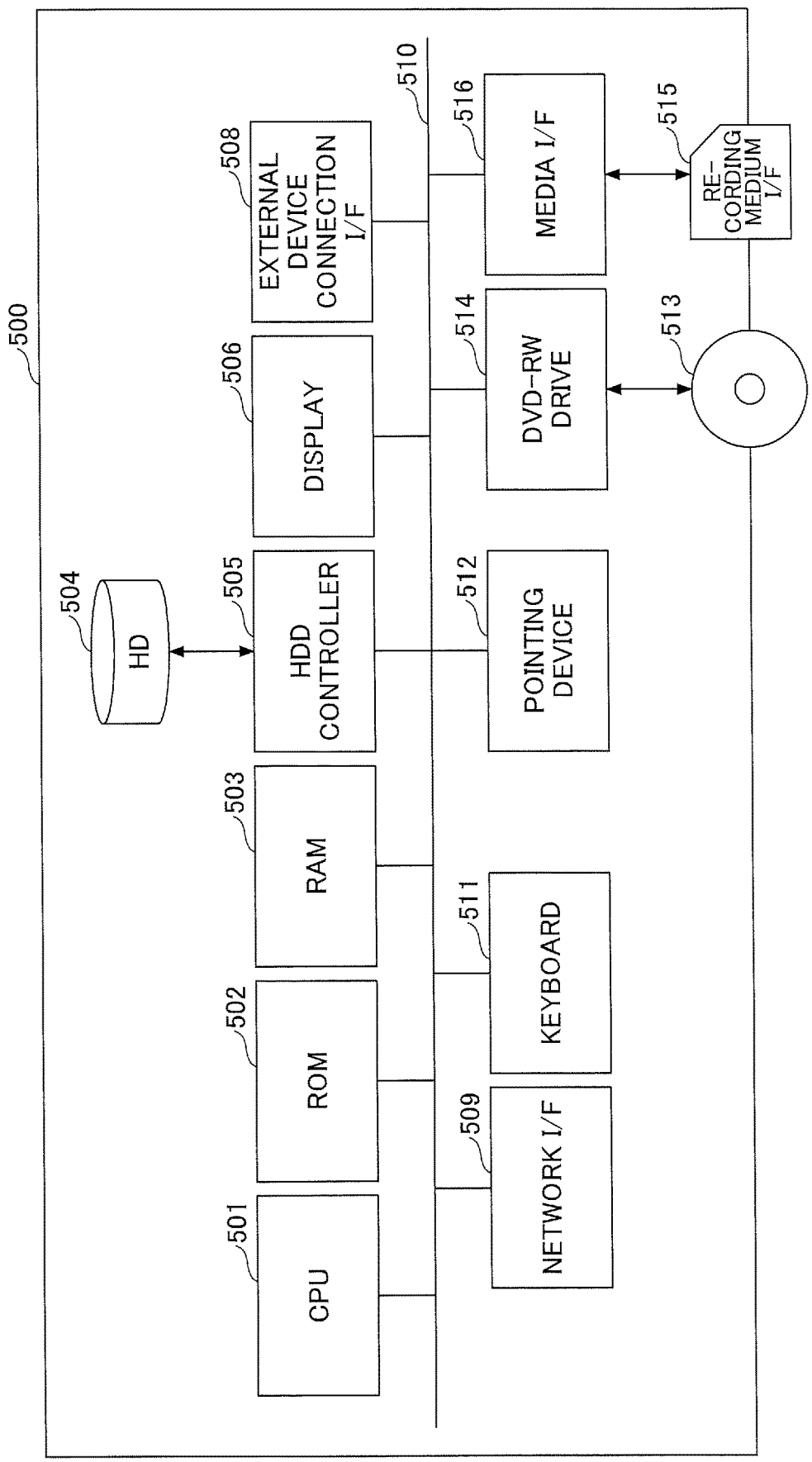
FIG. 3 is a hardware structural diagram of an example of a computer.

The first terminal device 20, the second terminal device 30, the third terminal device 40, or the at least one information processing apparatus 50 illustrated in FIG. 2 are implemented, for example, by a computer having the hardware structure illustrated in FIG. 3. FIG. 3 is an example of the hardware structural diagram of the computer. The computer 500 of FIG. 3 is constructed by a computer and includes a CPU 501, ROM 502, RAM 503, HD 504, HDD controller 505 (Hard Disk Drive), display 506, external device connection I/F 508 (Interface), network I/F 509, bus line 510, keyboard 511, pointing device 512, DVD-RW (Digital Versatile Disk Rewritable) drive 514, and media I/F 516, as illustrated in FIG. 3.

Of these, the CPU 501 controls the operation of the entire computer. The ROM 502 stores a program used to drive the CPU 501, such as an IPL. RAM 503 is used as the work area of CPU 501. The HD 504 stores various data such as a program. The HDD controller 505 controls the reading or writing of various data to the HD 504 according to the control of the CPU 501. The display 506 displays various information such as cursors, menus, windows, characters, or images. The external device connection I/F 508 is an interface for connecting various external devices. In this case, the external device may be, for example, a USB (Universal Serial Bus) memory or a printer. The network I/F 509 is an interface for performing data communication using the communication network 100. The bus line 510 is an address bus, a data bus, or the like for electrically connecting components such as the CPU 501 illustrated in FIG. 3.

The keyboard 511 is also a type of input means with a plurality of keys for input of characters, numbers, various instructions, and the like. The pointing device 512 is a type of input means for selecting and executing various instructions, selecting a processing target, moving a cursor, and the like. The DVD-RW drive 514 controls the reading or writing of various data to the DVD-RW 513 as an example of a removable recording medium. It is not limited to DVD-RW, but may be DVD-R, etc. The media I/F 516 controls the reading or writing (storage) of data to a recording medium 515, such as a flash memory.

<<Image Forming Apparatus>>

Figure 4:
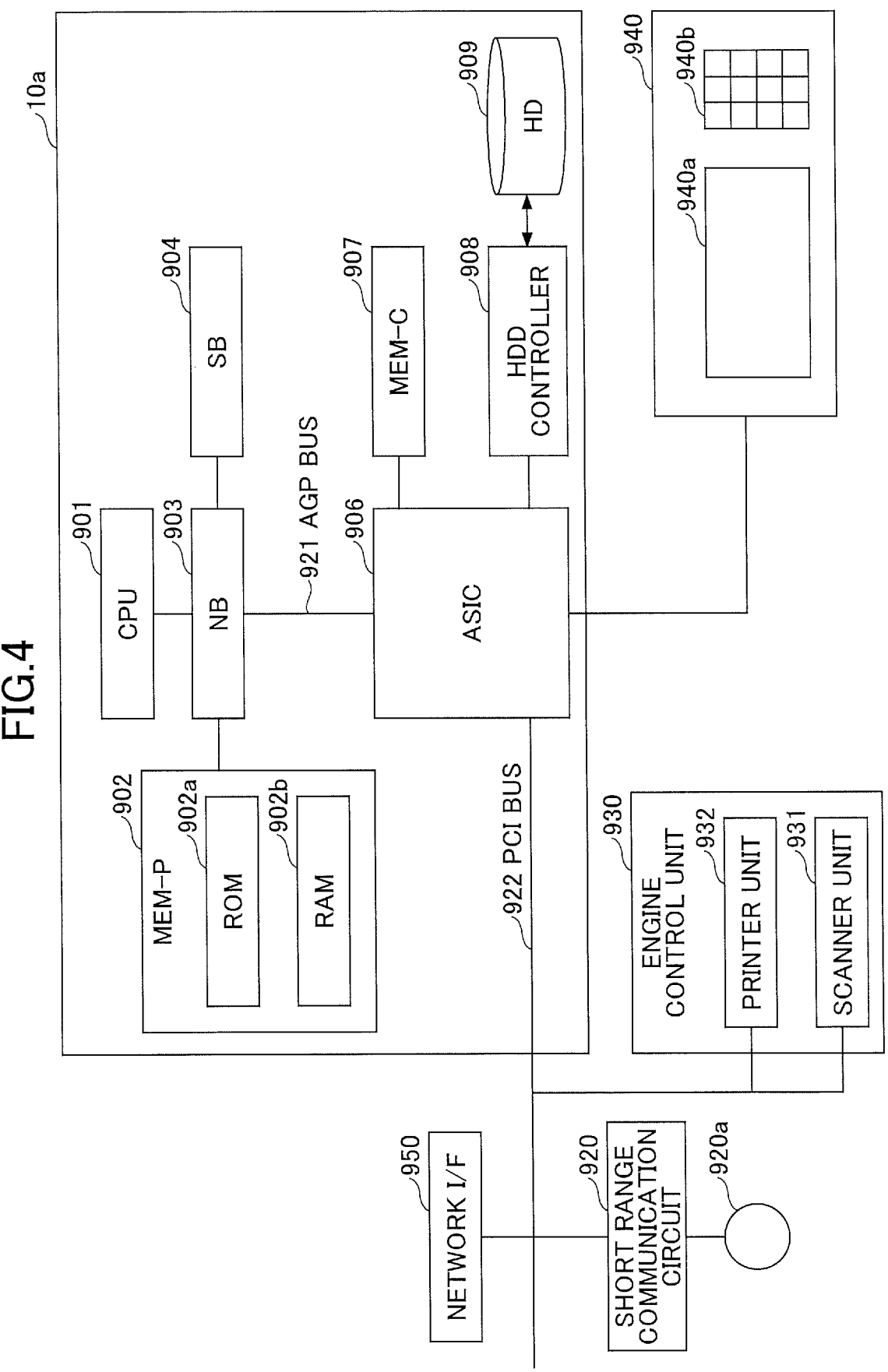
FIG. 4 is a hardware structural diagram of an example of an image forming apparatus.

FIG. 4 is an example of a hardware structural diagram of the image forming apparatus 10*a*. As illustrated in FIG. 4, the image forming apparatus 10*a* includes a controller 910, a shortrange communication circuit 920, an engine control unit 930, an operation panel 940, and a network I/F 950.

Among these, the controller 910 includes the CPU 901, the system memory 902 (MEM-P), the north bridge 903 (NB), the south bridge 904 (SB), the ASIC 906 (Application Specific Integrated Circuit), the local memory 907 (MEM-C), the HDD controller 908, and the HD 909, which are the main part of the computer, and is connected to the NB 903 by the AGP bus 921 (Accelerated Graphics Port) between the NB 903 and the ASIC 906.

Of these, the CPU 901 is a control unit that performs an overall control of the image forming apparatus 10*a*. NB 903 is a bridge for connecting the CPU 901 to the MEM-P 902, SB 904, and AGP bus 921 and has a memory controller for controlling reading and writing to MEM-P 902, a PCI (Peripheral Component Interconnect) master, and an AGP target.

The MEM-P 902 includes ROM 902*a*, which is a memory for storing programs and data in which each function of the controller 910 is implemented, and RAM 902*b*, which is used as a program or data expansion and a drawing memory for printing the memory. The program stored in RAM 902*b* may be configured to be recorded in a computer-readable recording medium such as a CD-ROM, a CD-R, or a DVD in a file in an installable format or an executable format.

The SB904 is a bridge for connecting NB903 to the PCI devices and peripheral devices. The ASIC 906 is an integrated circuit (IC) that has a hardware element for processing images, and serves as a bridge connecting the AGP bus 921, the PCI bus 922, the HDD controller 908, and the MEM-C907, respectively. The ASIC 906 includes a PCI target and AGP master, an arbitrator (ARB) that forms the core of the ASIC 906, a memory controller that controls the MEM-C907, a plurality of DMACs (Direct Memory Access Controllers) that rotates image data by hardware logic, and the like, and a PCI unit that performs data transfer between the scanner unit 931 and the printer unit 932 via the PCI bus 922. The interface of the USB (Universal Serial Bus) or the IEEE 1394 (Institute of Electronic and Electronic Engineers 1394) may be connected to the ASIC 906.

The MEM-C907 is a local memory used as an image buffer and a code buffer for copying. The HD 909 is a storage device for storing image data, storing font data used for printing, and storing foam. The HD 909 controls the reading or writing of data to the HD 909 according to the control of the CPU 901. The AGP bus 921 is a proposed bus interface for graphics accelerator cards to speed up graphics processing. By directly accessing MEM-P 902 with high throughput, the graphics accelerator card can be made faster.

The shortrange communication circuit 920 is provided with a shortrange communication circuit antenna 920*a*. The shortrange communication circuit 920 is a communication circuit such as an NFC, Bluetooth ("Bluetooth" is a registered trademark), or the like.

The engine control unit 930 further includes a scanner unit 931 and a printer unit 932. The operation panel 940 includes a panel display section 940*a*, such as a touch panel, for displaying a current setting value, a selection screen, or the like, for receiving an input from an operator, and a hard key 940*b*, such as a ten key and a start key for receiving a copy start instruction, for receiving a set value of an image forming condition, such as a concentration setting condition. The controller 910 performs a control of the entire image forming apparatus 10*a* and controls, for example, drawing, communication, an input from the operation panel 940, and the like. The scanner unit 931 or the printer portion 932 includes an image processing portion such as error diffusion or gamma conversion.

The application switching key of the operation panel 940 allows the image forming apparatus 10*a* to be selected by switching a document box function, copy function, a printer function, and facsimile function in this order. When the document box function is selected, the document box mode is set to copy mode, when the copy function is selected, the printer mode is set to printer mode, and when the facsimile mode is selected, the document box mode is set to a facsimile mode.

The network I/F 950 is an interface for performing data communication using the communication network 100. The shortrange communication circuit 920 and the network I/F 950 are electrically connected to the ASIC 906 via the PCI bus 922.

<Function>

Figure 5:
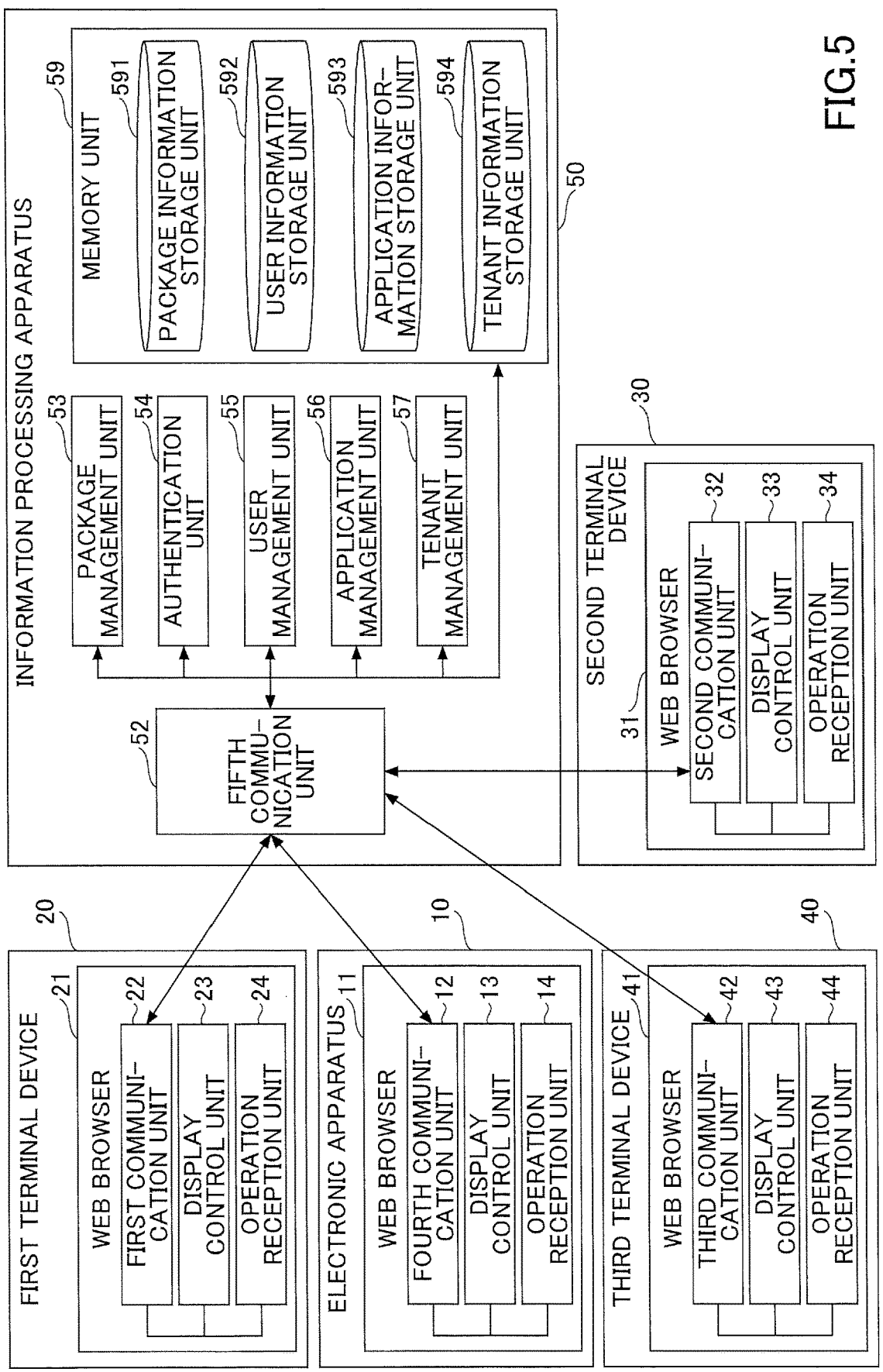
FIG. 5 is an example of a functional block diagram illustrating functions of a first terminal device, second terminal device, third terminal device, electronic apparatus, and the at least one information processing apparatus like a block shape.

The functions of each device of the information processing system 1 in accordance with the present embodiment are realized, for example, by the processing block illustrated in FIG. 5. FIG. 5 is an example of a functional block diagram describing the functions of the first terminal device 20, the second terminal device 30, the third terminal device 40, the electronic apparatus 10, and the at least one information processing apparatus 50 in a block shape.

<<First Terminal Device>>

The first terminal device 20 includes a first communication unit 22, a display control unit 23, and an operation reception unit 24. The first terminal device 20 executes a program (for example, a web browser 21) and realizes a function block as illustrated in FIG. 5.

The first communication unit 22 communicates with the at least one information processing apparatus 50 and receives screen information for displaying the user information registration screen or the like by the first terminal device 20. Further, the tenant manager C sends the information entered on the user information registration screen or the like to the at least one information processing apparatus 50.

The display control unit 23 analyzes screen information received from at least one information processing apparatus 50 and displays, for example, a user information registration screen on the display 506. The operation reception unit 24 receives the operation of the tenant manager C (for example, input to the user information registration screen and the package allocation screen) on the first terminal device 20.

<<Second Terminal Device>>

The second terminal device 30 includes a second communication unit 32, a display control unit 33, and an operation reception unit 34. The second terminal device 30 executes a program (for example, a web browser 31) and realizes a function block as illustrated in FIG. 5.

The second communication unit 32 communicates with the at least one information processing apparatus 50 and receives screen information for displaying the login screen, the home screen, or the like of the second terminal device 30. The information input to the login screen or the home screen by the user is sent to the at least one information processing apparatus 50.

The display control unit 33 analyzes screen information received from the at least one information processing apparatus 50 and displays, for example, a login screen or a home screen on the display 506. The operation reception unit 34 receives the user's operation to the second terminal device 30.

<<Third Terminal Device>>

The third terminal device 40 includes a third communication unit 42, a display control unit 43, and an operation reception unit 44. The third terminal device 40 executes a program (for example, the web browser 31) and implements a function block as illustrated in FIG. 5.

The third communication unit 42 communicates with the at least one information processing apparatus 50 and receives screen information for displaying a package newly creating screen or the like by the third terminal device 40. The information entered in the package new creation screen by the product designer P is sent to the at least one information processing apparatus 50.

The display control unit 43 analyzes screen information of a screen received from the at least one information processing apparatus 50 and displays, for example, a package new creation screen, on the display 506. The operation reception unit 34 receives the operation of the product designer P on the third terminal device 40.

<Electronic Apparatus>

The electronic apparatus 10 includes a fourth communication unit 12, a display control unit 13, and an operation reception unit 14. The electronic apparatus 10 executes a program (e.g., a web browser 11) to implement a functional block as illustrated in FIG. 5.

The fourth communication unit 12 communicates with the at least one information processing apparatus 50 and receives screen information for displaying the standby screen, the launcher screen, the login screen, the application screen, or the like of the electronic apparatus 10. The user sends the information input to the standby screen, the launcher screen, the login screen, and the application screen to the at least one information processing apparatus 50.

The display control unit 13 analyzes the screen information of the screen received from the at least one information processing apparatus 50 and displays, for example, a standby screen, a launcher screen, a login screen, and an application screen on the operation panel 940. The operation reception unit 14 receives a user operation (for example, starting the launcher, inputting the authentication information, selecting an application, operating an application, etc.) on the electronic apparatus 10.

<<At Least One Information Processing Apparatus>>

The at least one information processing apparatus 50 includes a fifth communication unit 52, package management unit 53, authentication unit 54, user management unit 55, application management unit 56, and tenant management unit 57. These functions of the at least one information processing apparatus 50 are implemented by executing a program in which the CPU 501 of the computer 500 illustrated in FIG. 3 is developed from the HD 504 to the RAM 503.

The fifth communication unit 52 sends and receives various information with the first terminal device 20, the second terminal device 30, the third terminal device 40, and the electronic apparatus 10. For example, the screen information of the user information registration screen or the package allocation screen is sent to the first terminal device 20, the screen information of a login screen or home screen is sent to the second terminal device 30, the screen information of a package new creation screen or the like is sent to the third terminal device 40, and the screen information of a standby screen, launcher screen, login screen, and application screen is sent to the electronic apparatus 10. The information input to these screens is also received.

The package management unit 53 manages application package information stored in the package information storage unit 591, which will be described later. For example, the application package information sent from the third terminal device 40 is registered, and the application package information is acquired from the package information storage unit 591.

The authentication unit 54 authenticates the product designer P, the tenant manager C, and the user to determine whether the authentication is successful or unsuccessful. The authentication refers to the determination of whether the person requesting the authentication is a legitimate authorized person. In the present embodiment, it is determined whether the at least one information processing apparatus 50 are authorized to be used, and it is also possible to determine which of the product designer P, the user, or the tenant manager C is authorized. Successful authentication means that the product designer P, the user, or the tenant manager C permits the at least one information processing apparatus 50 to log in. The login means an authentication activity for accessing a system resource by using pre-registered account information when using various services on a computer or the Internet. The account information may be a user ID and password, an IC card number, or a biometric information.

The user management unit 55 manages the user information and performs the registration of the user information to the user information storage unit 592, which will be described later, and acquires (reads) the user information from the user information storage unit 592.

The application management unit 56 manages each application, manages the default setting of the application for each user, and reflects the default setting in the application.

The tenant management unit 57 manages the tenant information related to the tenant and saves and acquires the tenant information in the tenant information storage unit 594.

The at least one information processing apparatus 50 includes a memory unit 59 implemented by the HD 504, the RAM 503, or the like illustrated in FIG. 3. The memory unit 59 includes a package information storage unit 591, a user information storage unit 592, an application information storage unit 593, and a tenant information storage unit 594. A package information storage unit 591 will be described using Table 1.

TABLE 1

APPLICATION PACKAGE INFORMATION

| ITEM | EXPLANATION |
|---|---|
| TENANT ID | TENANT IDENTIFICATION INFORMATION USING APPLICATION PACKAGE |
| PACKAGE NAME | NAME OF PACKAGE TO BE CREATED |
| EXPLANATION | EXPLANATION OF PACKAGE TO BE CREATED |
| DEVICE TYPE | TYPE OF DEVICE ENABLING PACKAGING AND APPLIED IN CASE OF DEVICE LICENSING (EX. IWB, MFP) |
| USABLE ROLE | ROLE USABLE ON CUSTOMER TENANT WHEN PACKAGE TO BE CREATED IS INTRODUCED (TENANT MANAGER, ORDINARY USER) |
| APPLICATION LIST | IDENTIFICATION INFORMATION OF APPLICATION INCLUDED IN PACKAGE |

Table 1 schematically shows the application package information stored in the package information storage unit 591. The application package information corresponds to the tenant ID and includes items, namely, the package name, explanation, device type, usable role, and application list.

The tenant ID is identification information to identify the tenant. ID stands for identification and means an identifier or identification information. An ID is a name, code, character string, numeric value, or at least one of these combinations used to uniquely distinguish a particular object from multiple objects. The same shall apply to IDs other than tenant ID.

Package name . . . is the name of the package created by the product designer P.
It should have an identification function.
Explanation of packages created by product designer P. The product designer P can set any information.
Device type . . . The type of Electronic apparatus available in the application package licensed to the Electronic apparatus (e.g. electronic chalkboard, image forming apparatus).
Usable role . . . This role is available on the tenant when an application package created by the product designer P is introduced. This is the role of the user who is authorized to use this application package. For example, the tenant manager C or ordinary user is set.
This is the identification information (application ID) of the application included in the application package.

TABLE 2

| ITEM | EXPLANATION |
|---|---|
| TENANT ID | TENANT ID TO WHICH USER BELONGS |
| USER ID | — |
| PASSWORD | — |
| FAMILY NAME | — |
| GIVEN NAME | — |
| MAIL ADDRESS | — |
| DISPLAYED LANGUAGE (LOCALE) | — |
| ACCOUNT STATE | VALID, INVALID, OR ACCOUNT LOCK |
| ROLE | MANAGER OR ORDINARY USER |
| INITIAL SETTING OF APPLICATION USE AUTHORITY | LIST OF APPLICATION PACKAGE |

Table 2 schematically shows the user information stored in the user information storage unit 592. The user information corresponds to the tenant ID. In other words, the number of the user information equals to the number of users belonging to the tenant. The user of the user information storage unit 592 includes the tenant manager C. The user information is registered by connecting the tenant manager C to the at least one information processing apparatus 50.

The user information includes the tenant ID, user ID, password, gender, name, mail address, display language (locale), account state, role, and initial setting of application use authority.

Identification information of the tenant to which the user belongs.
User ID . . . Identification information of the user.
Password . . . Confidential information to prove the identification of the user.
Family name is the surname of the user.
Given name . . . User name.
Mail address . . . the user's mail address.
Display language (locale) . . . is the language of characters displayed on the screen used by the user.
Account state . . . is the right of the user to log in to the at least one information processing apparatus 50. There are at least three states of the account: valid, invalid, or account lock. When the user information is tentatively registered, it becomes invalid and becomes valid by formal registration. The tenant manager C can make invalid after making valid. The account lock is set when the user makes a mistake in the password several times under the valid state. The account lock differs from invalid, for example, in that it returns to valid after a certain period of time or remains counted as the user belongs to the tenant.
Role . . . user authority. For example, "tenant manager C or ordinary user" exists. In this embodiment, the tenant manager and the ordinary user are referred to as the user.
The initial setting of the application usage authority . . . is a list of the applications packages available to this user. A list of application packages with user authority assigned to the user is included.

The tenant ID, account state, role, and "Initial setting of application use authority" that are not blank in Table 2 are automatically determined. The user ID, password, family name, given name, mail address, and display language (locale) in the blank field in Table 2 are set by Tenant manager C.

TABLE 3

| ITEM | EXPLANATION |
| --- | --- |
| TENANT ID | TENANT IDENTIFICATION INFORMATION USING APPLICATION |
| APPLICATION ID | APPLICATION IDENTIFICATION INFORMATION |
| ROLE | TENANT MANAGER OR ORDINARY USER |

Table 3 schematically shows the application information stored in the application information storage unit 593. The application information corresponds to the tenant ID and has items of the application ID and the role. The application information is registered by the product designer P according to the contract status of the service. It may be registered automatically by the service contract. Each application may or may not belong to the application package.

Tenant ID . . . is the identification information of the tenant in which the application is sold.

Application ID . . . is the identification information of the application ID . . . application.

Role . . . is the authority to use the app.

For example, "tenant manager C or ordinary user" exists. Either role of the tenant manager C or the ordinary user may be preferred.

TABLE 4

| ITEM | EXPLANATION |
| --- | --- |
| TENANT ID | TENANT IDENTIFICATION INFORMATION |
| TENANT NAME | TENANT NAME ETC. (CUSTOMER'S NAME) |
| REGISTRATION DATE | THIS IS REGISTRATION DATE TO TENANT |

Table 4 schematically shows the tenant information stored in the tenant information storage unit 594. The tenant information corresponds to the tenant ID and has items of the tenant name and the registration date.

Identification information of tenant ID . . . identification information of the tenant.

Tenant name . . . name of tenant, company name and department name.

Registration date . . . is the date of registering the tenant.

Incidentally, Tables 1 to 4 are only shown for the purpose of explaining the present embodiment, and those which are not major information are omitted.

<Process and Operation of Creating Application Package>

Figure 6:
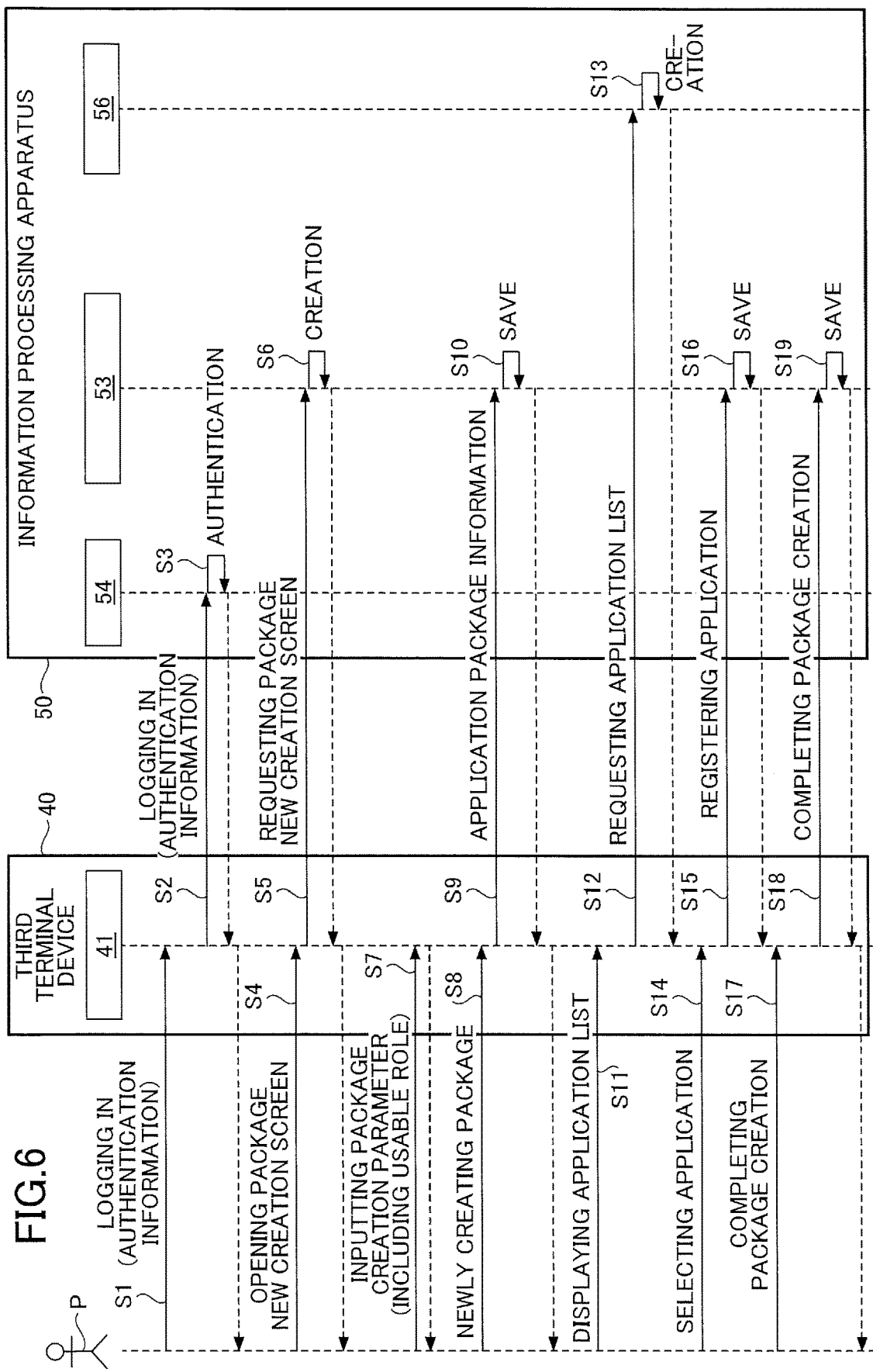
FIG. 6 is an example of a sequence diagram illustrating a procedure by which a product designer creates an application package.

FIG. 6 is an example of a sequence diagram showing a procedure in which a product designer P creates an application package.

S1: The product designer P first operates the third terminal device 40 to log in to the at least one information processing apparatus 50 (inputting the authentication information).

S2: The operation reception unit 44 of the third terminal device 40 receives an operation, and the third communication unit 42 sends an authentication request to the at least one information processing apparatus 50.

S3: A fifth communication unit 52 of the at least one information processing apparatus 50 receives the authentication request, and the authentication unit 54 authenticates the product designer P based on the authentication information. Here, authentication is considered successful.

The reaction of the application package or setting of the role is only permitted by the product designer P, and the tenant manager or ordinary user cannot set the role of the application package. That is, if the authentication unit authenticates as the tenant manager or ordinary user, it does not allow the role to be set in the application package. Only when the product designer P logs in can such a process be realized by the limitation that the following package new creation screen is displayed.

S4: The product designer P inputs an operation to open the package new creation screen into the third terminal device 40. In addition, the product designer may be able to set a role in which the right to use may be assigned for each application included in the application package. In this case, not to set the role (the role set for the whole application included in the package at once) for the application package on the package new creation screen.

S5: The operation reception unit 44 of the third terminal device 40 receives the operation, and the third communication unit 42 requests the at least one information processing apparatus 50 to send the package new creation screen.

Figure 8:
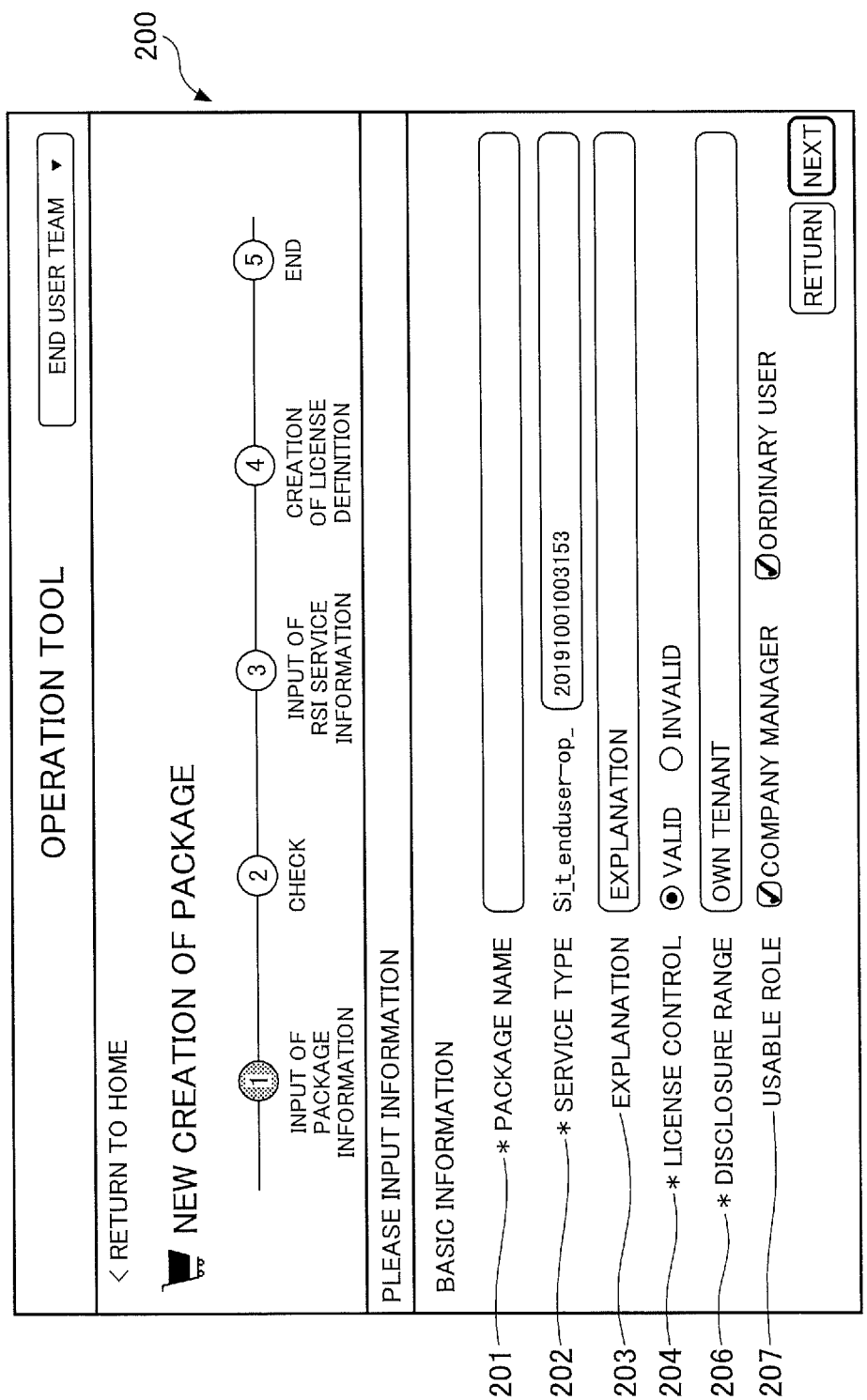
FIG. 8 illustrates an example of a package new creation screen.

S6: The fifth communication unit 52 of the at least one information processing apparatus 50 receives a request from the package new creation screen, and the package management unit 53 generates screen information of the package new creation screen. The screen information of the package new creation screen is sent to the third terminal device 40, and the display control unit 43 of the third terminal device 40 displays the package new creation screen. An example of the package new creation screen is illustrated in FIG. 8.

S7: the product designer P inputs the application package information including the role in which use authority may be assigned on the package new creation screen.

S8: The product designer P inputs the creation (execution) of the application package.

S9: The operation reception unit 44 of the third terminal device 40 receives an input and requests the at least one information processing apparatus 50 to receive the application package information input by the third communication unit 42.

S10: The fifth communication unit 52 of the at least one information processing apparatus 50 receives the application package information, and the package management unit 53 stores the application package information in the package information storage unit 591.

S11: The product designer P then enters an operation for displaying an application list into the third terminal device 40 in order to register the application in the application package.

S12: The operation reception unit 44 of the third terminal device 40 receives an input, and the third communication unit 42 requests the at least one information processing apparatus 50 to send an application list.

Figure 10:
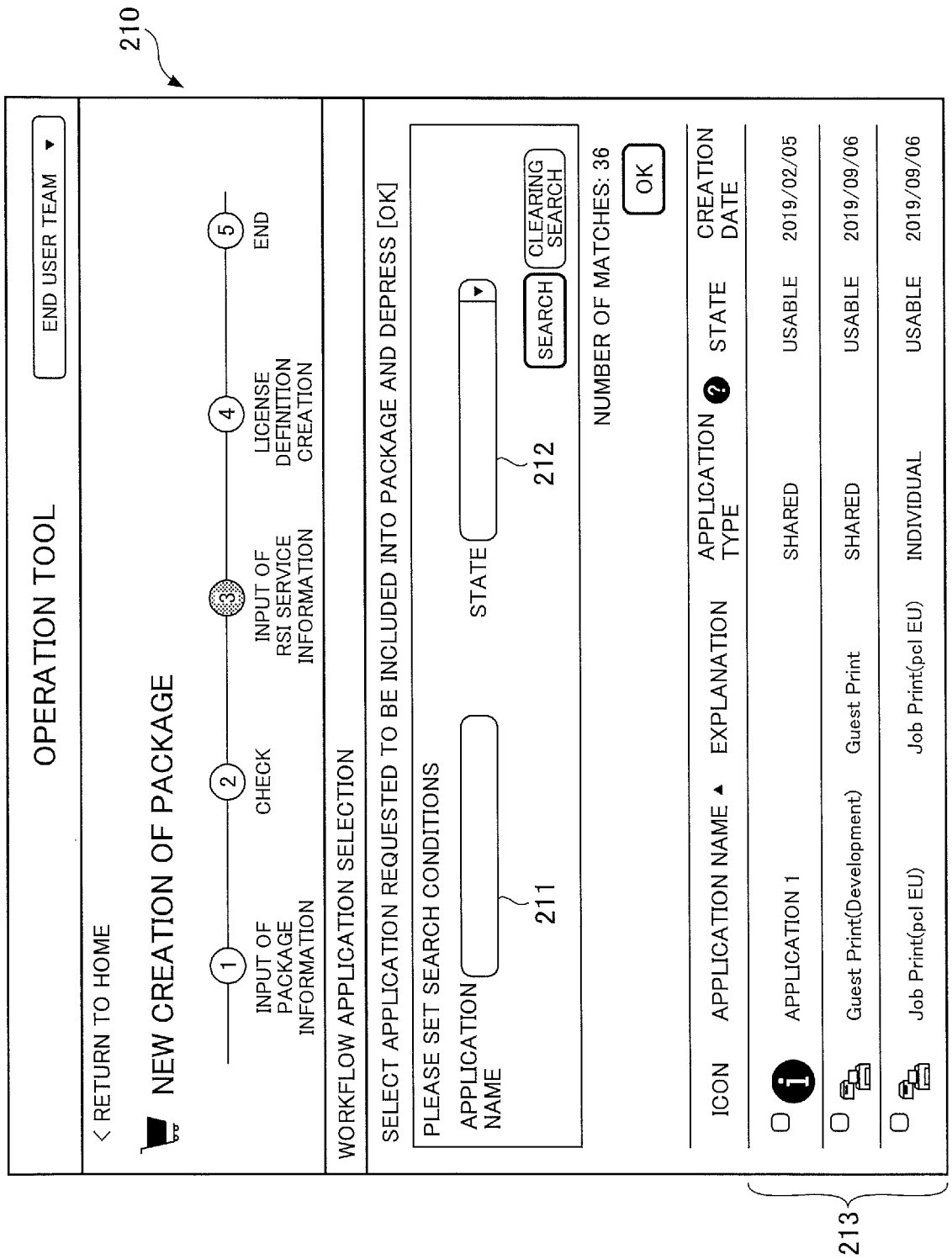
FIG. 10 illustrates an example of an application list screen.

S13: The fifth communication unit 52 of the at least one information processing apparatus 50 receives a request for the application list, and the application management unit 56 creates the screen information of the application list by referring to the application information storage unit 593. The application list that the product designer P can include in the application package is predetermined depending on the service content of the customer. The screen information of the application list is sent to the third terminal device 40, and the display control unit 43 of the third terminal device 40 displays the application list screen. An example of the application list screen is illustrated in FIG. 10.

S14: the product designer P selects the application from the application list screen.

When the role is set for each application, the product designer P may set the role for each application each time the application is selected. In this case, if the role for the application package (the whole) is already set, the product designer P changes (cancels) the role for the application package without changing it. The operation reception unit 44 of the third terminal device 40 receives the cancellation. Alternatively, the change (cancellation) execution may be accepted via the change check screen. When the operation reception unit 44 receives the cancellation of the role of the application package, the operation reception unit 44 continuously accepts the setting of the role of the application which can be used. However, when the role of the application package is not canceled, the operation reception unit 44 does not accept the setting of the role which can use the application.

S15: The operation reception unit 44 of the third terminal device 40 receives the selection of the application, and the third communication unit 42 requests the at least one information processing apparatus 50 to send the application.

S16: The fifth communication unit 52 of the at least one information processing apparatus 50 receives the identification information of the application and registers the application in the application package created by the package management unit 53.

S17: the product designer P inputs the fact that the application package has been created in the application list screen. For example, an end button displayed in the message indicating the registration completion of the application is depressed or a creation end button provided on the application list screen is depressed.

S18: The operation reception unit 44 of the third terminal device 40 receives the end of the creation, and the third communication unit 42 requests the at least one information processing apparatus 50 to end the package creation.

S19: The fifth communication unit 52 of the at least one information processing apparatus 50 receives the end of the creation and stores the application package created by the package management unit 53.

The above process creates the application package. At this point, the application package is created, but it is not associated with the tenant. The product designer P then makes the application package to be associated with the tenant.

Figure 7:
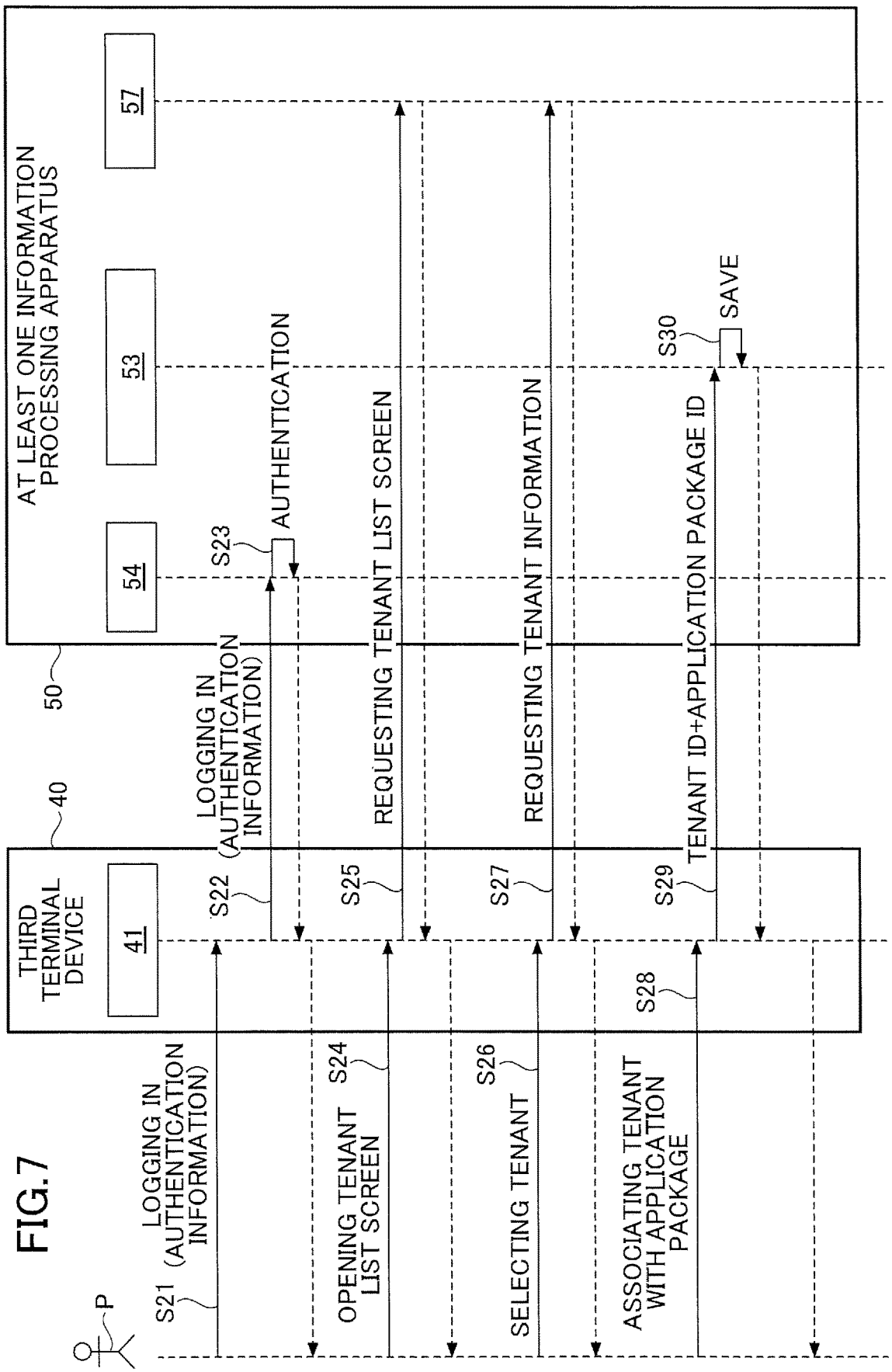
FIG. 7 is an example of a sequence diagram illustrating how the product designer causes the application package to be associated with the tenant.

FIG. 7 is an example of a sequence diagram showing a procedure in which a product designer P causes the application package to be associated with the tenant.

S21-S23: Logins may be the same as Steps S1-S3 of FIG. 6. If the product designer P operates after FIG. 6, it does not have to log in.

S24: The product designer P then enters an operation to display the tenant list screen into the third terminal device 40.

S25: The operation reception unit 44 of the third terminal device 40 receives an input, and the third communication unit 42 requests the at least one information processing apparatus 50 to send the tenant information. The fifth communication unit 52 of the at least one information processing apparatus 50 receives a request for the tenant information list, and the tenant management unit 57 creates screen information of the tenant list with reference to the tenant information storage unit 594. The tenant list is a tenant list to which the product designer P can assign the application package. For example, it may be a tenant (e.g., a customer list) which has subscribed to the service. The screen information of the tenant list is sent to the third terminal device 40, and the display control unit of the third terminal device 40 displays the tenant list screen. An example of the tenant list screen is illustrated in FIG. 11.

S26: Next, the product designer P selects the tenant to assign the application package on the tenant list screen.

Figure 12:
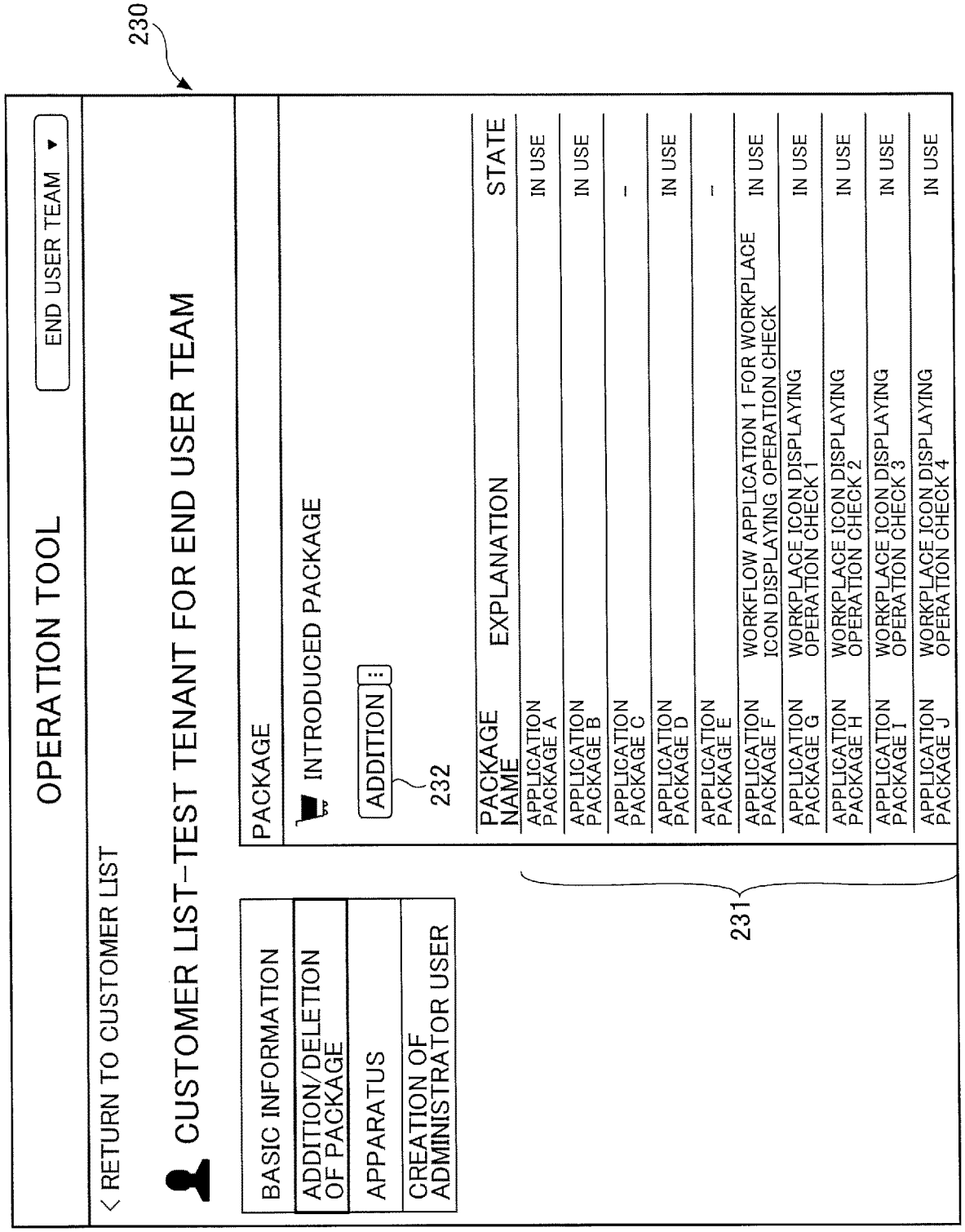
FIG. 12 illustrates an example of a tenant information screen.

S27: The operation reception unit 44 of the third terminal device 40 receives the selection and sends the identification information of the tenant to the at least one information processing apparatus 50. The fifth communication unit 52 of the at least one information processing apparatus 50 receives the identification information of the tenant, and the tenant management unit 57 creates the screen information of the tenant information associated with the identification information of the tenant with reference to the tenant information storage unit 594. The screen information of the tenant information is sent to the third terminal device 40, and the display control unit 43 of the third terminal device 40 displays the tenant information screen. An example of the tenant information screen is illustrated in FIG. 12.

S28: The product designer P then enters an operation to add the application package to the tenant.

S29: The operation reception unit 44 of the third terminal device 40 receives the operation, and the third communication unit 42 requests the identification information of the tenant to the at least one information processing apparatus 50.

S30: The fifth communication unit 52 of the at least one information processing apparatus 50 receives the tenant identification information, and the package management unit 53 registers the package information storage unit 591 in association with the application package.

As a result, the package information with the role set in the application package is created.

<Example of Screen for Creating Application Package>

Figure 9:
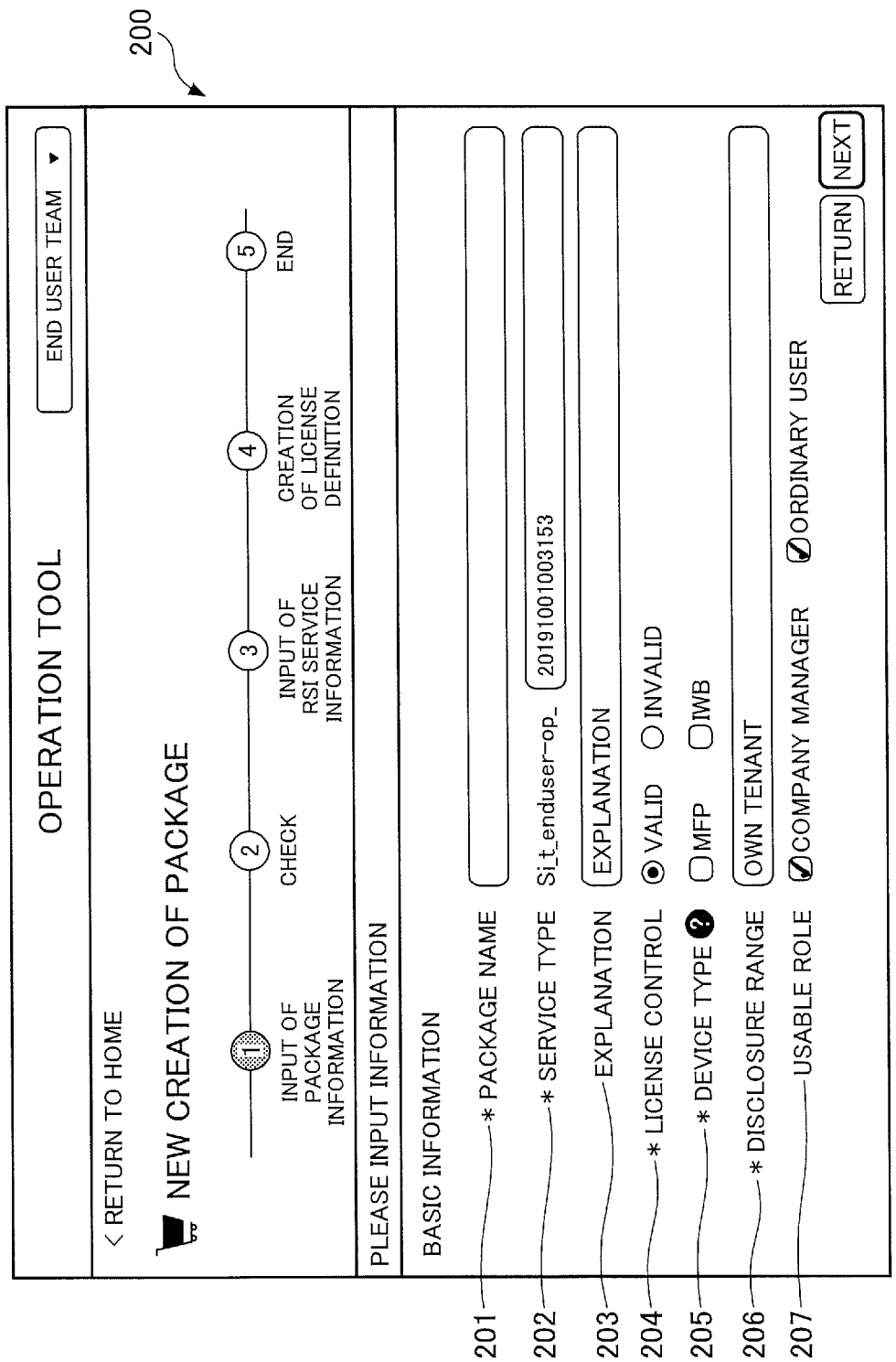
FIG. 9 illustrates another example of the package new creation screen.

A screen example when an application package is created will be described with reference to FIGS. 8 to 13. FIGS. 8 and 9 are examples of the package new creation screen 200. The package new creation screen 200 is a screen by which the product designer P creates the application package. Package name field 201 is the field in which the name of the application package is entered. Service type field 202: Identification information of the application package. Explanation field 203: Explanation of the application package. License control field 204: It is set whether the item of the device type of package information is made valid. FIG. 9 illustrates the package new creation screen 200 when the license control field 204 is set to be "valid". Device control field 205: To be displayed when the license control field is set to "valid". This setting corresponds to the item of device type of the application package information, and sets the type of electronic apparatus in the case of an application package licensed to the electronic apparatus. Disclosure range field 206: The scope of the application package to be disclosed. Usable role field 207: User's role that tenant manager C can set the usage authority for the user to use this application package.

FIG. 10 is an example of the application list screen 210. The application information screen has a structure similar thereto.

Application name field 211: The application name to be searched is input to this field. State field 212 designates the application state being retrieved (e.g., whether it is reaching a capacity and is unavailable). The application list 213 conforming to the application list is displayed. Everything may be displayed without displaying anything before the search. The application name, explanation, application type, state, and creation date are displayed.

FIG. 11 is an example of the tenant list screen 220. The tenant list screen 220 is a screen in which a specific tenant (the tenant to which the application package is assigned) is selected from the customer list (the tenant list). Customer name field 221: The tenant name of the tenant to be searched is entered. Tenant ID field 222: This field is used to enter the tenant ID of the tenant to be searched. Registration date field 223: The registration date of the tenant to be searched is input. A state field 224 specifies the state of the tenant to be searched (during service, before the start of service, etc.). Tenant List 225 displays a tenant list that fit the search. Everything may be displayed without displaying anything before the search. The tenant list displays the customer name, tenant ID, status, registration date, and so on.

When the product designer P selects the tenant name in the tenant list screen 220 of FIG. 11, the tenant information screen 230 of FIG. 12 is displayed. FIG. 12 illustrates an example of the tenant information screen 230. The tenant information screen 230 is a screen for adding the application package to a specific tenant. The tenant Information screen displays a list of application packages already introduced in this tenant. The list 231 is displayed based on the application package associated with the tenant ID in the package information storage unit 591.

Figure 13:
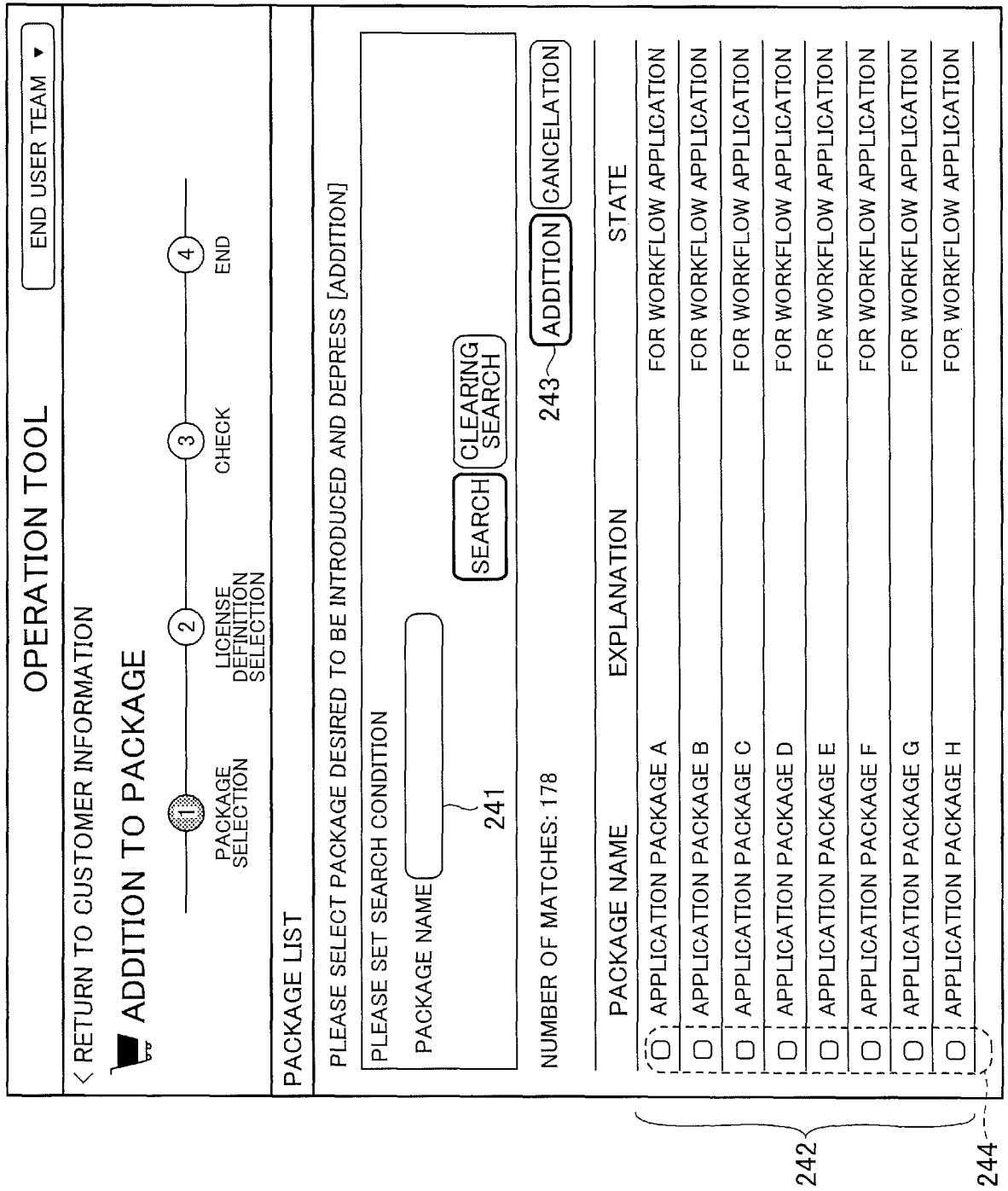
FIG. 13 illustrates an example of a non-introduction package list screen.

The tenant information screen 230 has an adding button 232. When the product designer P depresses the adding button 232, a non-introduction package list screen 240 illustrated in FIG. 13 is displayed. FIG. 13 illustrates an example of the non-introduction package list screen 240. The non-introduction package list screen 240 is a screen that displays the application package not associated with the tenant selected in FIG. 11. Package name field 241: This field inputs the name of the application package to be searched. A package list 242 displays a list of application packages that fit the search. Everything may be displayed without displaying anything before the search. The adding button 243 is a button to associate the application package selected by the radio button 244 at the top of the package list with the tenant.

Thus, the application package selected in FIG. 13 is associated with the tenant selected in FIG. 11.

<Processing and Operation of User Registration>

Figure 14:
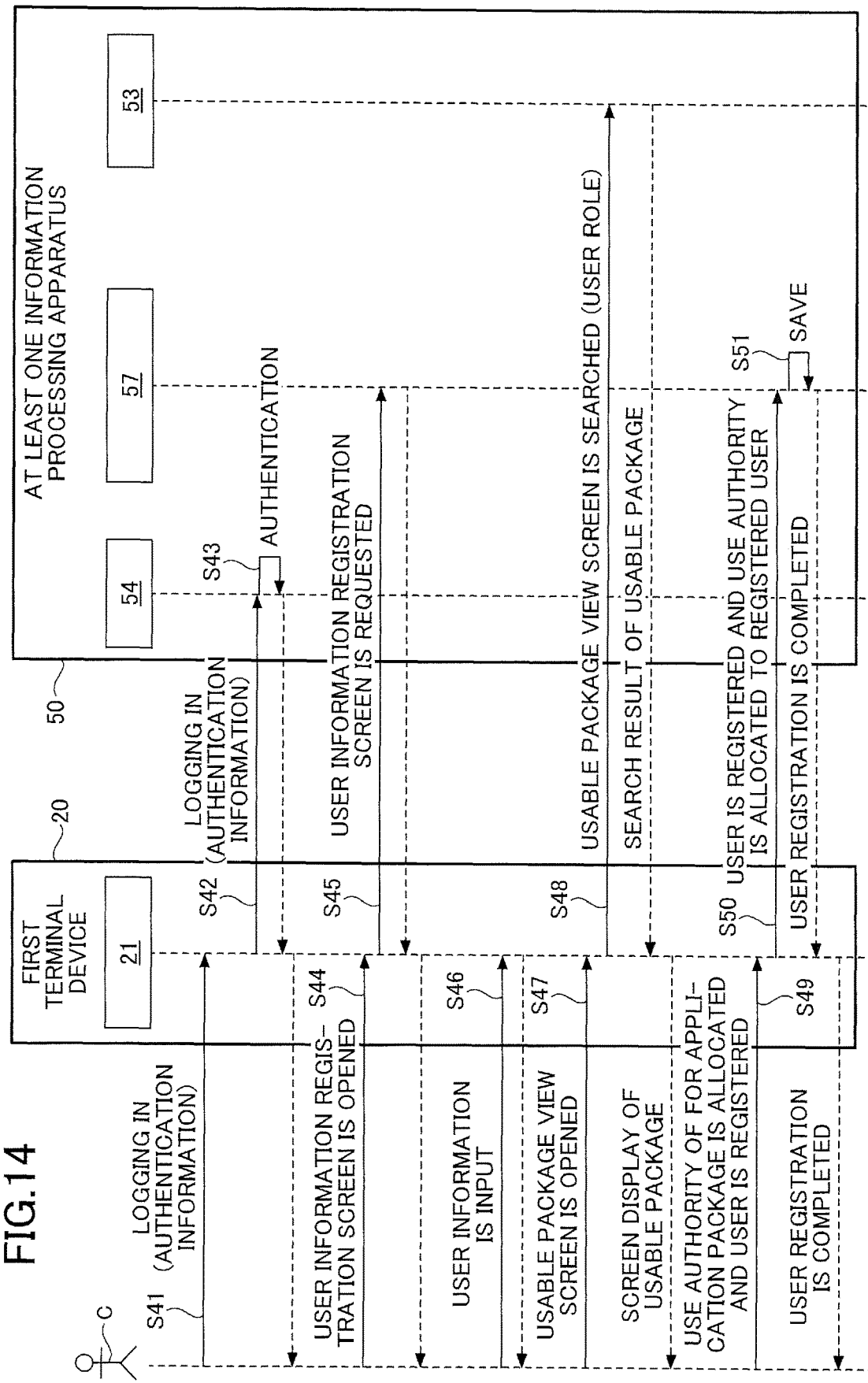
FIG. 14 is an example of a sequence diagram explaining the process and operation in which a tenant manager registers a user with a tenant.

Next, a process and an operation for registering the user with the tenant by the tenant manager C will be described with reference to FIG. 14. FIG. 14 is an example of a sequence diagram illustrating the process and the operation in which the tenant manager C registers the user with the tenant.

S41-S43: The login operation may be similar to steps S1-S3 of FIG. 6.

S44: The tenant manager C inputs an operation for opening the user information registration screen into the first terminal device 20.

Figure 15:
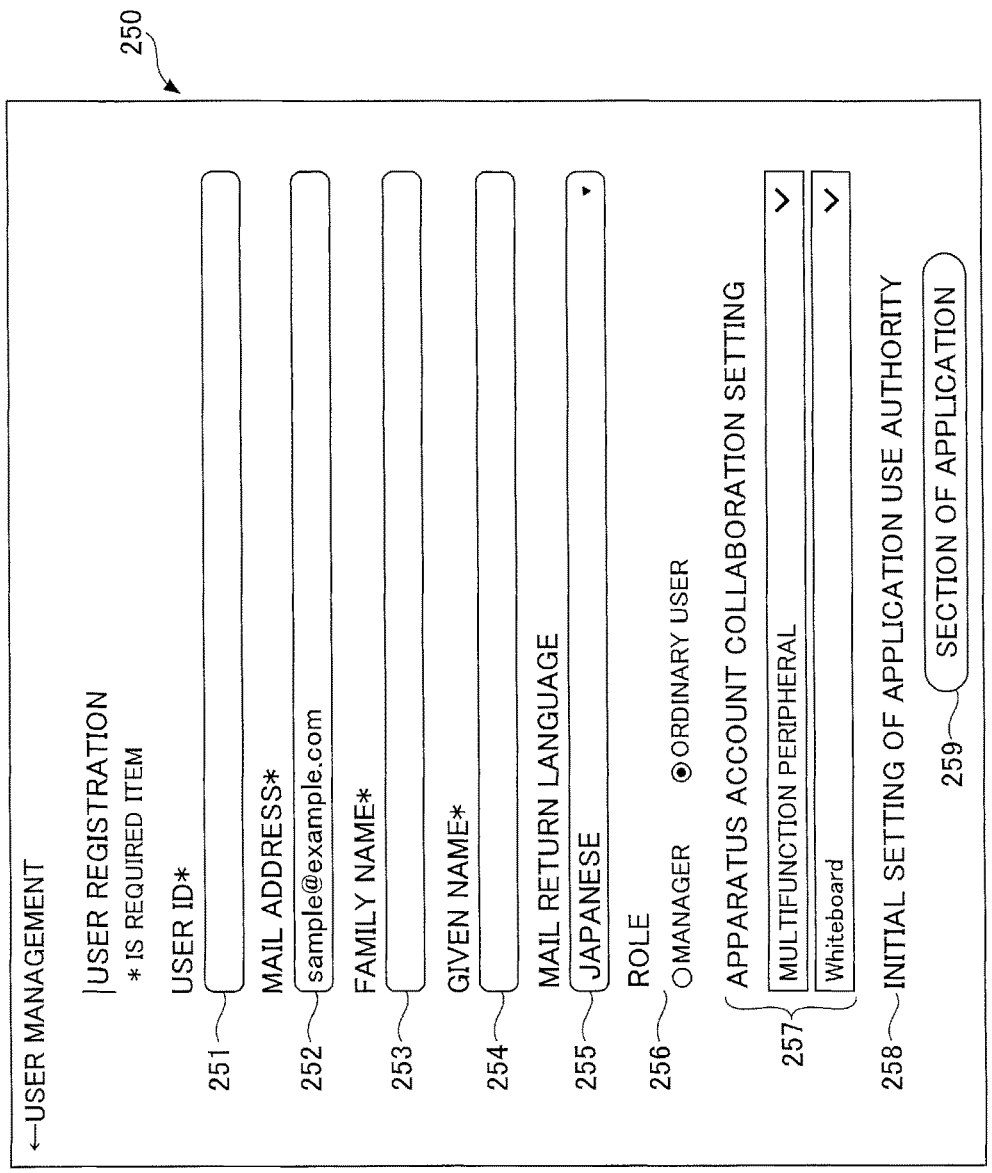
FIG. 15 is a diagram illustrating an example of a user information registration screen.

S45: The operation reception unit 24 of the first terminal device 20 receives the operation, and the first communication unit 22 requests the at least one information processing apparatus 50 to have the user information registration screen. The fifth communication unit 52 of the at least one information processing apparatus 50 receives a request from the user information registration screen, and the user management unit 55 creates screen information of the user information registration screen. The screen information of the user information registration screen is sent to the first terminal device 20, and the display control unit 23 of the first terminal device 20 displays the user information registration screen. An example of the user information registration screen is illustrated in FIG. 15.

S46: Tenant manager C inputs the user information including the role into the user information registration screen. The operation reception unit 24 of the first terminal device 20 receives an input.

S47: Tenant manager C performs the operation of displaying a list of the application packages usable by this user.

Figure 16:
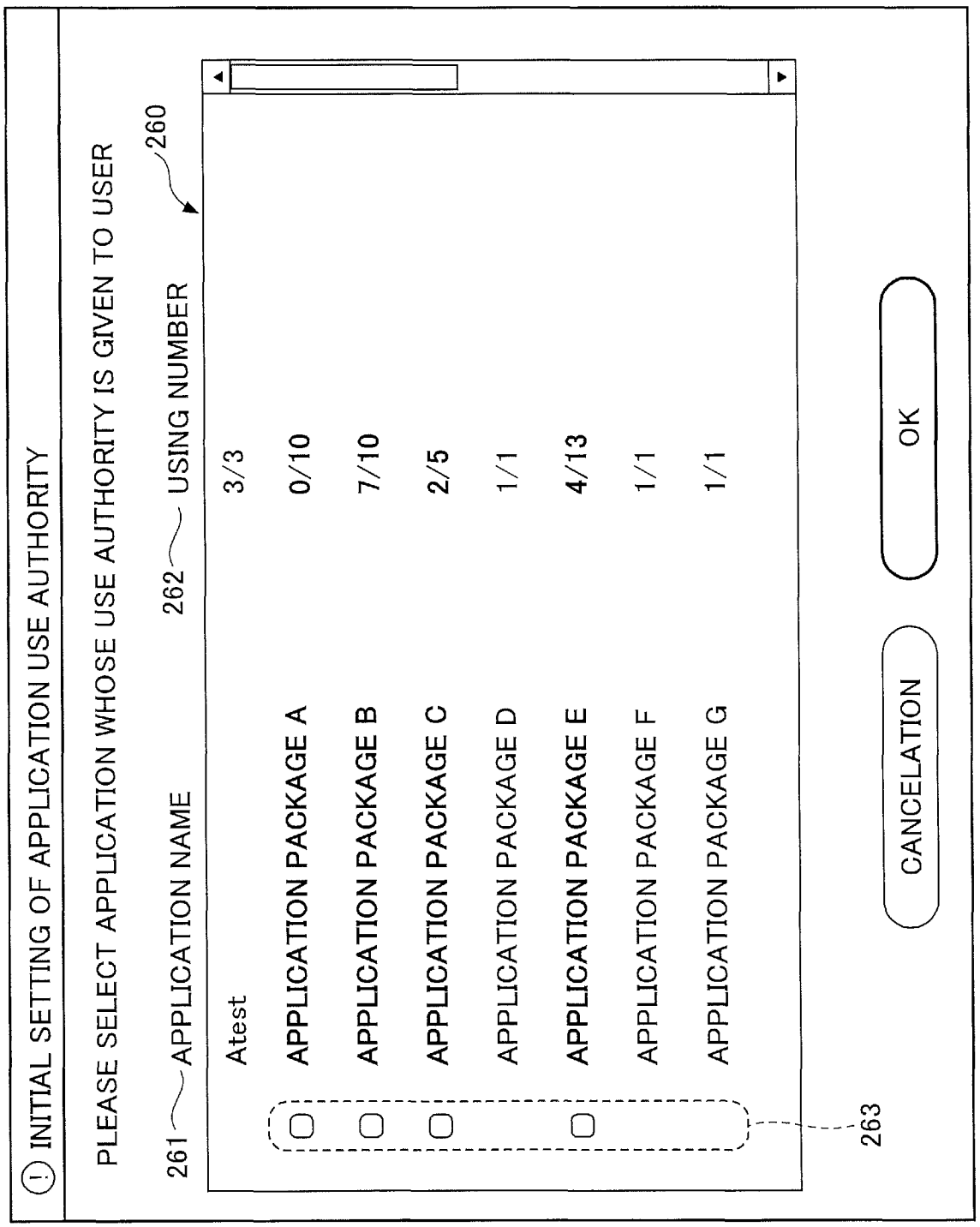
FIG. 16 is a diagram illustrating an example of a usable package list screen.

S48: The operation reception unit 24 of the first terminal device 20 receives an input and requests the at least one information processing apparatus 50 to send a list of application packages usable by the first communication unit 22 together with the role of the user. The fifth communication unit 52 of the at least one information processing apparatus 50 receives the request for sending the list of available application packages, and the package management unit 53 searches the package information storage unit 591 based on the role of the user. The package management unit 53 generates screen information of the list screen of the application package adapted for search. The screen information of the list screen of the usable application packages is sent to the first terminal device 20, and the display control unit 23 of the first terminal device 20 displays the list screen of the available application packages. An example of the application package list screen is illustrated in FIG. 16.

S49: Tenant manager C assigns the application package to the user on the list screen of the available application package. That is, it accepts the application package selection. This allows or restricts the user's use of the application package.

S50: The operation reception unit 24 of the first terminal device 20 receives an input and requests the at least one information processing apparatus 50 to register user information including identification information of the selected application package.

S51: The fifth communication unit 52 of the at least one information processing apparatus 50 receives the registration request of the user information, and the user management unit 55 registers the user information in the user information storage unit 592. That is, the user management unit 55 accepts a correspondence between the application package and the tenant to whom the service using the application package is provided.

In this way, the application package use authority an be assigned only to the users that the tenant manager C wants to use by using the role set in the application package.

<Example of Screen for Storing User Information>

A screen example for registering user information will be described with reference to FIGS. 15 to 17. FIG. 15 is an example of the user information registration screen 250. The user information registration screen 250 is a screen on which the tenant manager C registers the user information. User ID field 251: This field is used to enter the user ID. Mail address field 252: This field is used to enter the user's mail address. Last name field 253: The last name of the user is entered. Name field 254 is the field in which the user's name is entered. Mail return language 255 is a field in which the language in which the at least one information processing apparatus 50 respond to mail is set. Role field 256: Role of tenant manager C or ordinary user is set. Functional account linkage setting field 257: The electronic apparatus is selected when the user information and the electronic apparatus account are linked. This is the initial setting field 258 of the application usage authority, which is used to select the application package by depressing on the selection button 259. Depress the select button 259 to move to the usable package list screen 260 of FIG. 16.

FIG. 16 is an example of the available package list screen 260. The usable package list screen 260 displays a list of usable application packages in the role of the user to be registered. In the usable package list screen 260, the application name 261 is associated with the usage number 262. The application name 261 is the name of the application package available in the user's role. The number of uses 262 is the current quota number (numerator) for the contractually determined maximum quota number (denominator). Tenant manager C selects an application package that checks a check box 263 and assigns access rights.

If the current quota number (numerator) reaches the maximum quota number (denominator), check box 263 is not displayed, the application name and the number of use are displayed with semi-brightness, and tenant manager C cannot select.

If a role is set for each application included in the application package and at least one user role is set for each application, the application package may be displayed as an application package and it may be possible to allocate use authority per application on the detailed screen after package selection.

Figure 17:
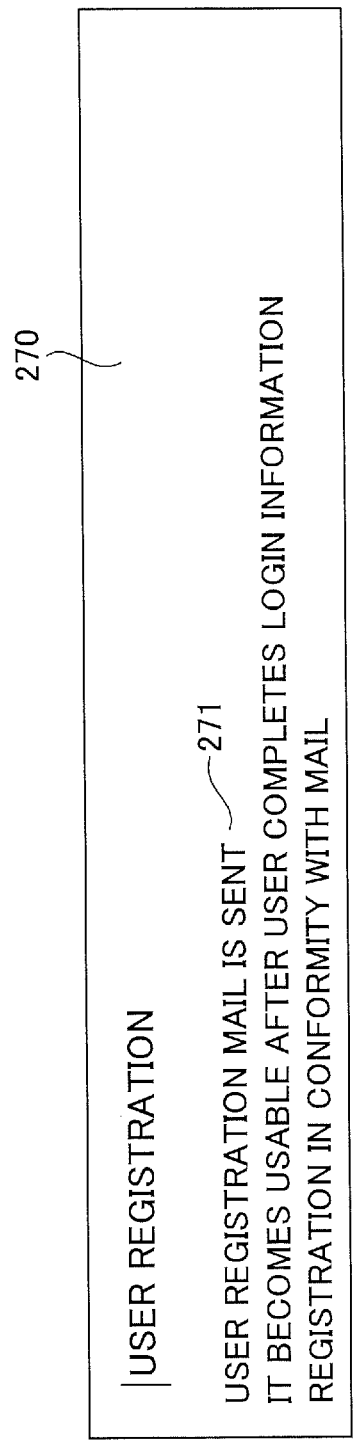
FIG. 17 is a diagram illustrating an example of a user registration mail send screen.

FIG. 17 is a diagram illustrating an example of the user registration mail sending screen 270. When the tenant manager C registers the application package with the user, the e-mail send screen 270 for user registration as illustrated in FIG. 17 is displayed. The message 271 "User registration e-mail sent. User registration is available when login information registration is completed" is displayed on the user registration e-mail send screen 270. A user receives mail, accesses the URL specified in the mail, and registers authentication information among the user information.

<Processing and Operation of User Login>

Figure 18:
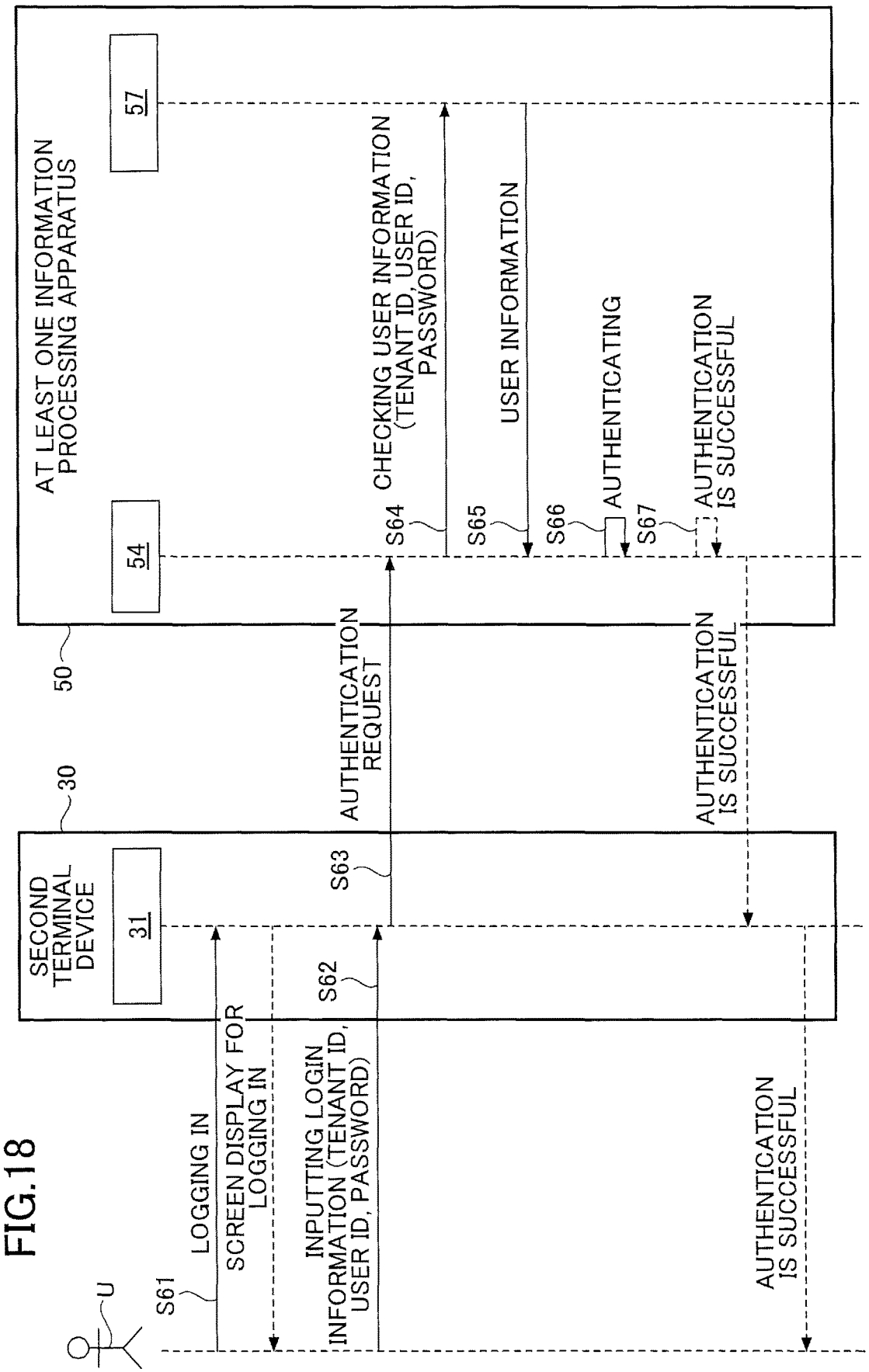

Next, a process and an operation at the time of login of a user will be described with reference to FIG. 18. FIG. 18 is an example of a sequence diagram illustrating a process and an operation when the user logs in. The user may be a ordinary user or a tenant manager C.

S61: The user U operates the second terminal device 30 to communicate with the at least one information processing apparatus 50 and displays the login screen.

S62: User U inputs authentication information. For example, the tenant ID, user ID and password, or mail address and password.

S63: The operation reception unit 34 of the second terminal device 30 receives the input, and the second communication unit 32 requests the at least one information processing apparatus 50 to perform authentication information.

S64: The fifth communication unit 52 of the at least one information processing apparatus 50 receives the authentication information, and the authentication unit 54 sends the tenant ID and the user ID to the user management unit 55.

S65: The user management unit 55 sends the user information corresponding to the tenant ID and the user ID to the authentication unit 54.

S66: The authentication unit 54 determines whether the tenant ID, the user ID, and the password input by the user are the same as those registered in the user information storage unit 592.

S67: In the case of successful authentication, the authentication unit 54 sends the successful authentication to the second terminal device 30.

At the time of the successful authentication, the at least one information processing apparatus 50 sends the screen information of the home screen corresponding to the user to the second terminal device 30. Therefore, the user of the second terminal device 30 can select the application only from the application having the usage authority. That is, the second terminal device 30 displays only the application included in the application package set in the initial setting of the of application use authority of the user information.

<Login Screen>

Figure 19:
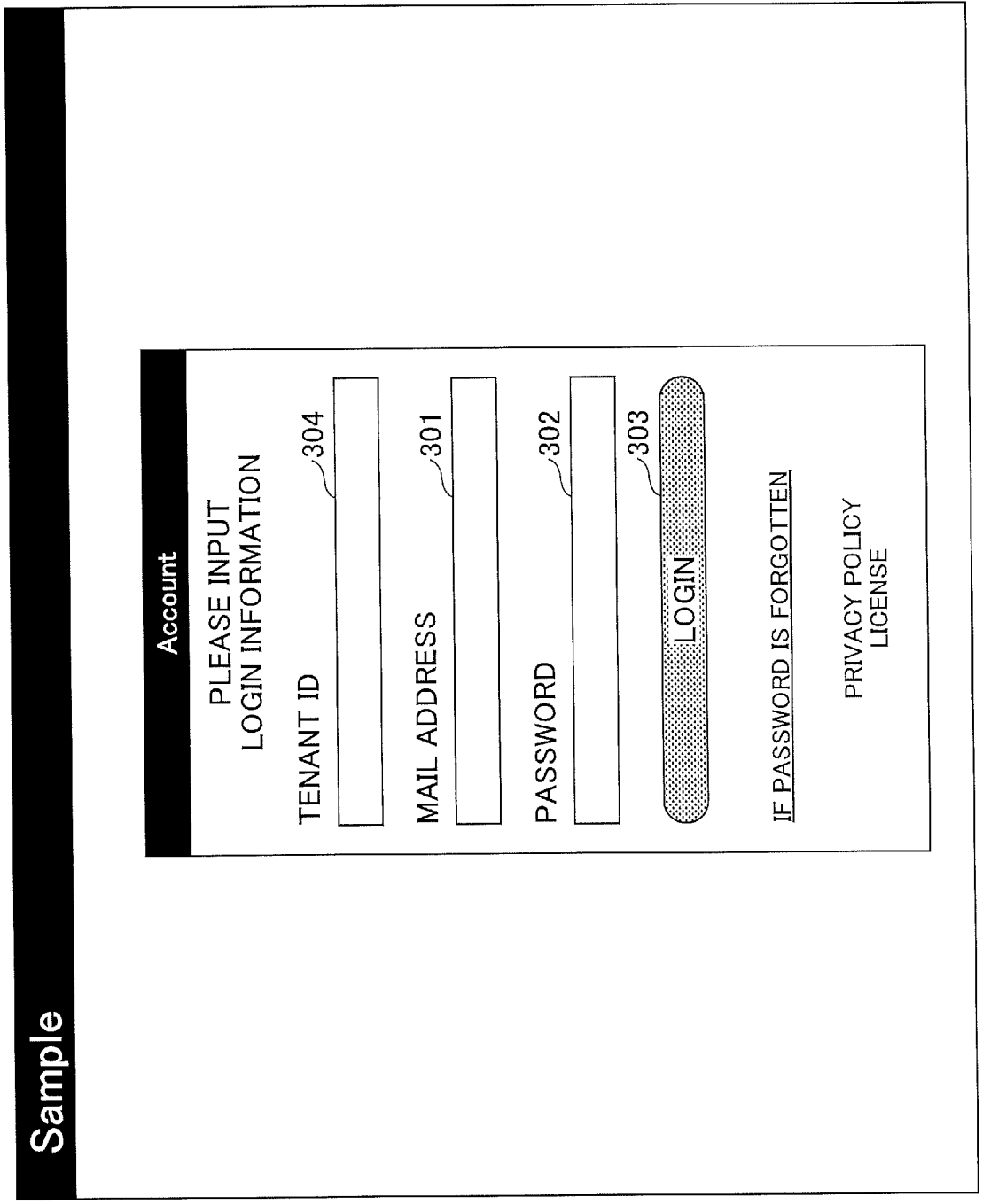
FIG. 19 is a diagram illustrating an example of a login screen.

FIG. 19 illustrates an example of a login screen. FIG. 19 is an example of the login screen 300 displayed by the second terminal device 30. The login screen 300 includes a tenant ID field 304, user ID field 301, password field 302, and login button 303. The user enters the tenant ID in the tenant ID field, enters the user ID in the user ID field 301, and inputs the user's password in the password field 302. These are examples of the authentication information. When the user depresses the login button 303, a login request is sent to the at least one information processing apparatus 50. The user can also log in to the mail address and password.

Figure 20:
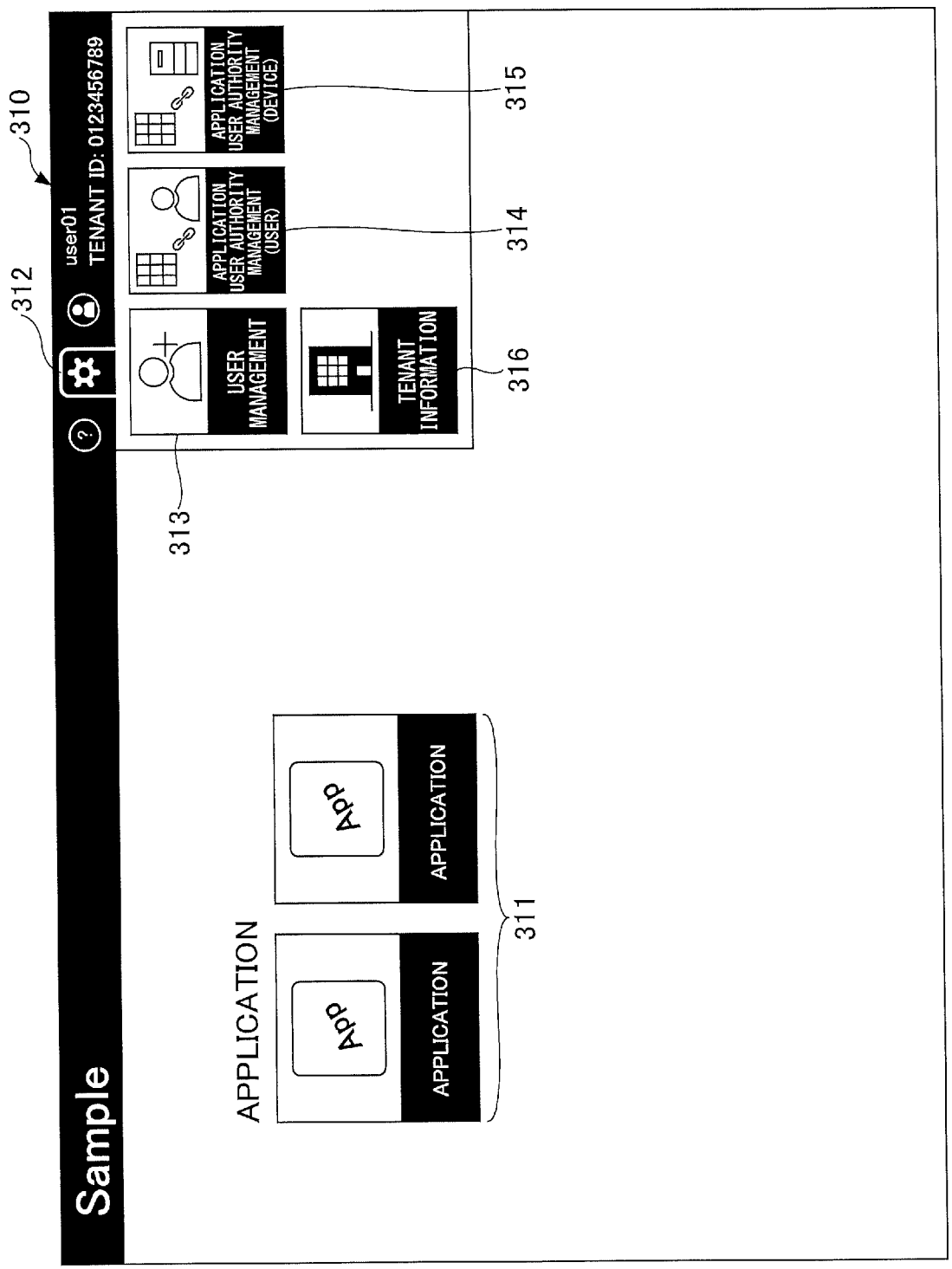
FIG. 20 illustrates an example of a home screen where a tenant manager logs in and the first terminal device displays.

FIG. 20 is an example of the home screen 310 in which the tenant manager C logs in and the first terminal device 20 displays. When the login request is successfully authenticated, the first terminal device 20 displays the home screen 310. The home screen 310 displays a list 311 of an application list 311 in which the tenant manager C has the right to use the application in the user information. The similar is applies to the ordinary users. Further, the screen window 310 has a setting button 312. When the tenant manager C depresses the setting button 312, buttons of the user management 313, the application usage authority management (user) 314, the application use right management (device) 315, and the tenant information 316 are displayed. The user management 313 is a button that displays the user management screen for tenant manager C to manage the user. The application usage authority management (user) 314 is a button for displaying a screen for managing which applications can be used by which user. The application usage authority management (device) 315 is a button for displaying a screen for managing which electronic apparatus 10 can use the application. The tenant information 316 is a button for displaying a screen for displaying the tenant contract details or the like.

Figure 21:
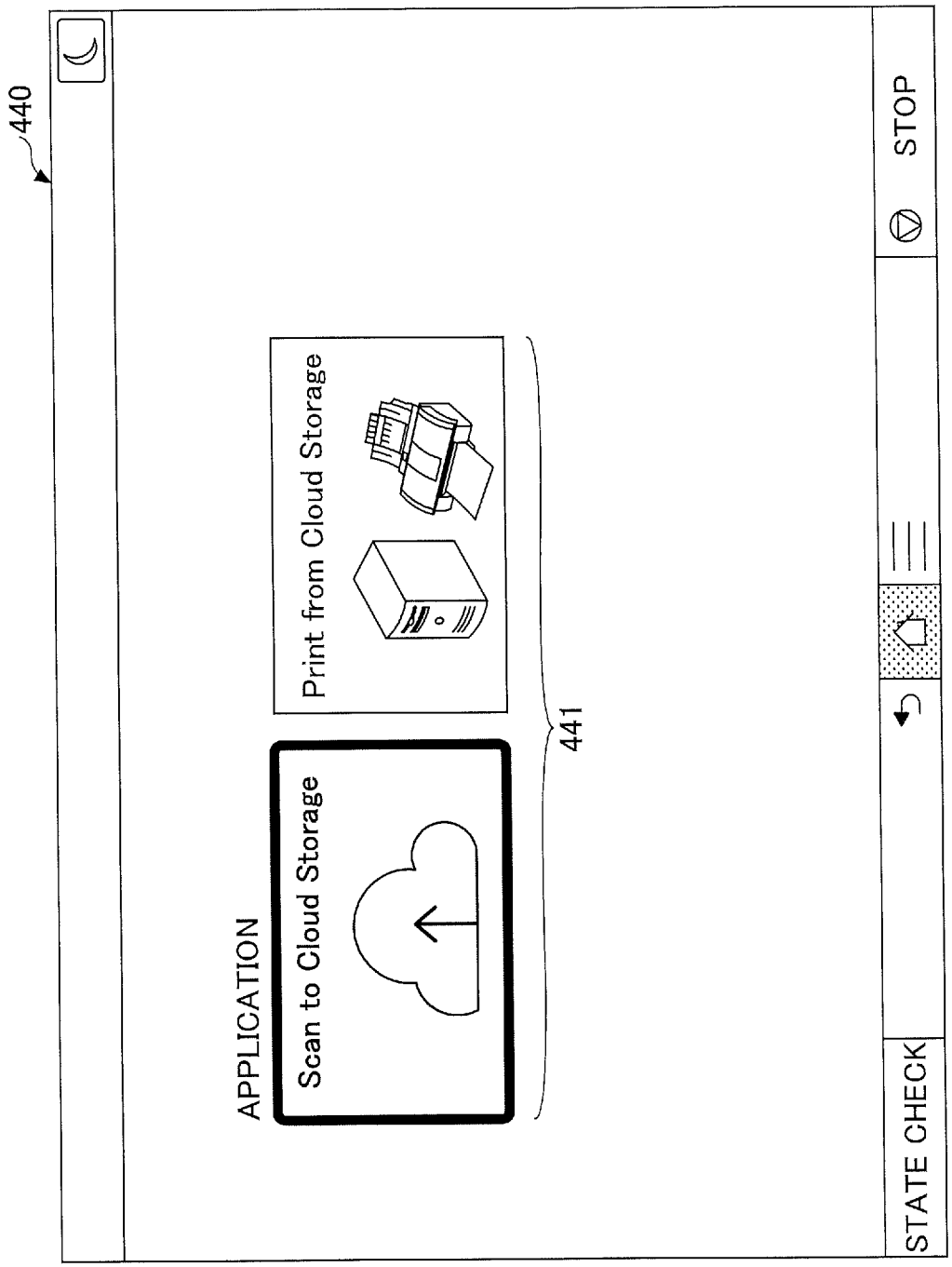
FIG. 21 illustrates an example of a home screen displayed by a second terminal device in which an ordinary user log.

FIG. 21 is a diagram illustrating an example of the home screen 460 displayed by the second terminal device 30 logged in by the ordinary user. Although the structure is the same as that of the home screen 310 for the tenant manager C illustrated in FIG. 20, the setting button 312 is not displayed. This is because it is not necessary for the user to conduct the setting for tenant manager C. However, the setting button 312 may be displayed on the user's home screen 460. In the home screen 460, an application in which the logged-in user is granted the usage authority can be set. Depending on the application, it may be possible to execute the processing (image formation, etc.) using the electronic apparatus 10 from the home screen.

<Allocation of Application Package after User Registration>

In FIG. 14, the application package was allocated to the user at the time of registration of the user information, but it is possible for the tenant manager C to assign the application package to the registered user.

FIG. 22 is an example of a sequence diagram showing a process in which a tenant manager C allocates an application package to a registered user.

The login operations S71-S73 may be the same as steps S1 to S3 of FIG. 6.

S74: The tenant manager C inputs the operation for opening the application package usage authority management screen into the first terminal device 20.

S75: The operation reception unit 24 of the first terminal device 20 receives the operation, and the first communication unit 22 requests the at least one information processing apparatus 50 to the application package usage authority management screen. The fifth communication unit 52 of the at least one information processing apparatus 50 receives a request from the application package usage authority management screen, and the user management unit 55 generates screen information of the application package usage authority management screen. The login of the tenant manager C identifies the tenant and aggregates the number of application packages assigned to users with the same Tenant ID for each application package. The maximum number of application packages that can be allocated is assumed to be fixed. In addition, the application package for which the user is authorized to use the application privilege is read by each user from the initial setting of the application usage authority of the user information. The screen information of the application package usage authority management screen is sent to the first terminal device 20, and the display control unit 23 of the first terminal device 20 displays the application package usage authority management screen. An example of the application package usage authority management screen is illustrated in FIG. 23.

S76: Tenant manager C assigns the user the usage authority to use the application package. The operation reception unit 24 of the first terminal device 20 receives the input.

S77: The first communication unit 22 of the first terminal device 20 sends identification information of the user associated with the tenant manager C and identification information of the assigned application package to the at least one information processing apparatus 50.

S78: The user management unit registers the identification information of the application package in association with the user information identified by the user's identification information (an item of initial setting of the application usage authority).

<<Application Package Usage Authority Management Screen>>

FIG. 23 illustrates an example of the application package usage authority management screen 360. The application package usage authority management screen 360 is a screen on which the tenant manager C assigns the application package usage authority to each user. The application package usage authority management screen 360 displays the usage authority 362 of each application package corresponding to the user ID 361. Each user can use an app with a checkmark 364 with the usage authority 362. The usage authority state 363 for each application sets the maximum number of licenses (denominator) for each application, so that the number of licenses (numerator) currently assigned to each application can be determined. The usage authority 362 reflects the "initial setting of the application usage authority" in the user information of each user. The tenant manager C can edit which user has the right to use (permit) or cancel (restriction) each application package on the application package usage authority management screen 360.

A negative mark 365 indicates that the tenant manager C is not assigned (is prohibited) with the usage authority in correspondence between user and application package. Depending on the role of the user, the application package may not be available, and the user may be marked with a negative mark 365. For example, when the item of the usable role of the application package information in Table 1 is "manager," the application package usage authority management screen 360 displays the negative mark 365 corresponding to the ordinary user. On the other hand, the user who is blank on the application package usage authority management screen 360 is a user who does not have the usage authority.

<Addition of an Application to an Application Package>

It is also possible for the product designer P to register or delete applications that have already been created.

FIG. 24 is an example of a sequence diagram illustrating a procedure in which the product designer P adds the application to the application package.

S81-S83: A login operation may be the same as step S1-S3 of FIG. 6.

S84: The product designer P inputs the operation for opening the package list screen into the third terminal device 40.

S85: The operation reception unit 44 of the third terminal device 40 receives the operation, and the third communication unit 42 requests the package list screen to the at least one information processing apparatus 50. The fifth communication unit 52 of the at least one information processing apparatus 50 receives the request of the package list screen and the package management unit 53 generates the screen information of the package list screen. The package management unit 53 acquires the application package information stored in the package information storage unit 591 and generates the screen information of the package list screen. The tenant may be designated. The screen information of the package list screen is sent to the third terminal device 40, and the display control unit 43 of the third terminal device 40 displays the package list screen. The package list screen may be the same as, for example, FIG. 12.

S86: The product designer P selects the package to which the application is added.

Figure 25:
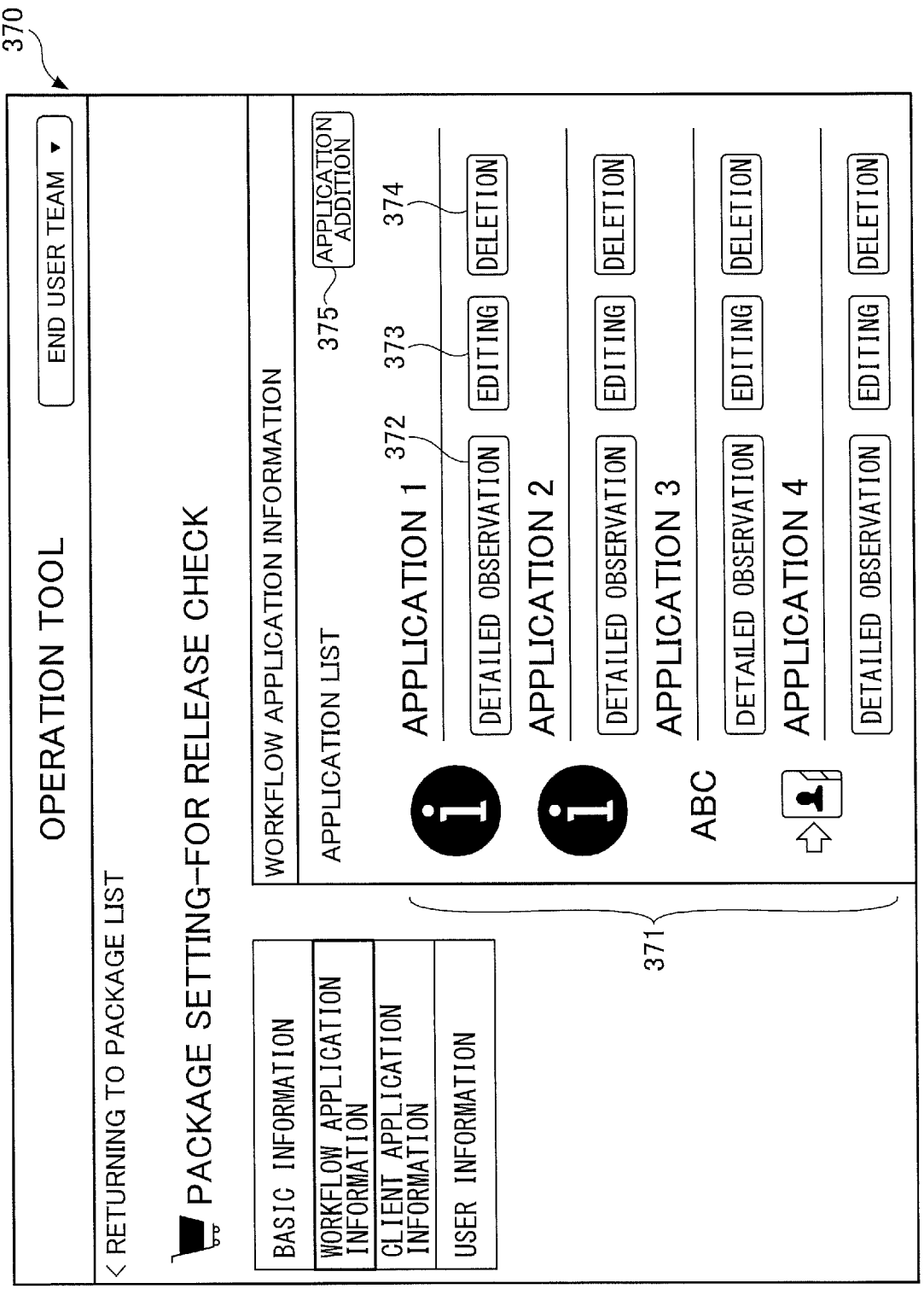
FIG. 25 illustrates an example of an application list screen.

S87: The operation reception unit 44 of the third terminal device 40 receives the selection, and the third communication unit 42 specifies the identification information of the package, and requests the at least one information processing apparatus 50 to list the applications included in the package. The fifth communication unit 52 of the at least one information processing apparatus 50 receives the application list request and generates screen information of the application list screen included in the package in which the package management unit 53 is designated. The package management unit 53 acquires the application included in the application package from the application package stored in the package information storage unit 591 and generates screen information of the application list screen. The screen information of the application list screen is sent to the third terminal device 40, and the display control unit 43 of the third terminal device 40 displays the application list screen. An example of the application list screen is illustrated in FIG. 25.

S88: the product designer P depresses application add button 375 (FIG. 25) of the application.

S89: The operation reception unit 44 of the third terminal device 40 receives the operation, and the third communication unit 42 designates the tenant ID and requests the application selection screen to be sent to the at least one information processing apparatus 50. The fifth communication unit 52 of the at least one information processing apparatus 50 receives the request of the application selection screen, and the application management unit 56 generates the screen information of the application selection screen. The application management unit 56 concludes a contract with the customer based on the tenant ID to specify the application package or the application and creates the screen information of the application selection screen. The screen information of the application selection screen is sent to the third terminal device 40, and the display control unit 43 of the third terminal device 40 displays the application selection screen. An example of the application selection screen is illustrated in FIG. 26.

S90: The product designer P selects the application on the application selection screen.

S91: The operation reception unit 44 of the third terminal device 40 receives the operation, and the third communication unit 42 requests the identification information of the application to the at least one information processing apparatus 50.

S92: The fifth communication unit 52 of the at least one information processing apparatus 50 receives identification information of the application, and the package management unit 53 registers the application in the package.

As described above, an application can be registered in a package that has already been created.

<<Application List Screen, Application Selection Screen>>

FIG. 25 is a diagram illustrating an example of the application list screen 370. The application list screen 370 is a screen on which the product designer P edits the application included in the application package. The application list screen 370 includes an application list 371, detail button 372, edit button 373, delete button 374, and application add button 375. The detail button 372 is a button to display the processing contents of the application, the edit button 373 is a button to edit a combination of components and change a workflow, and the delete button 374 is a button to delete the application from the application package. The add button 375 of the application is a button for adding the application to the application package. When the application add button 375 of the application is depressed, the application selection screen 380 of FIG. 26 is displayed. FIG. 26 illustrates an example of the application selection screen 380. The application selection screen 380 may be similar to that of FIG. 10.

SUMMARY

As described above, the information processing system according to the present embodiment can prevent the product designer P from setting a role in the application package and assigning the right to use the application package to users who are not desired to be used by the tenant manager C.

Other Applications

While the preferred embodiment of the present invention has been described with reference to examples, various modifications and substitutions may be made thereto without departing from the spirit and scope of the invention.

For example, in this embodiment, each terminal device uses a general-purpose web browser, but a dedicated application may be used for the information processing system.

The structure example illustrated in FIG. 5 is divided according to the main functions in order to facilitate understanding of processing by the first terminal device 20, the second terminal device 30, the third terminal device 40, the electronic apparatus 10, and the at least one information processing apparatus 50. The invention of the present application is not limited by the method of dividing the processing unit or by the name. The processing of the first terminal device 20, the second terminal device 30, the third terminal device 40, the electronic apparatus 10, and the at least one information processing apparatus 50 may be divided into more processing units depending on the processing contents. Alternatively, one processing unit can be split to include more processing.

Also, the devices described in the examples are merely indicative of one of a plurality of computing environments for carrying out the embodiments disclosed herein. In some embodiments, the at least one information processing apparatus 50 include a plurality of computing devices such as a server cluster. The plurality of computing devices are configured to communicate with each other via any type of communication link, including networks, shared memory, and the like, and perform the processes disclosed herein.

In addition, the at least one information processing apparatus 50 may be configured to share the disclosed processing steps, for example, FIGS. 6, 7, 14, 18, 22, and 24 in various combinations. For example, a process performed by a predetermined unit may be performed by a plurality of information processing apparatus having the at least one information processing apparatus 50. The at least one information processing apparatus 50 may be grouped into one server device or divided into a plurality of devices.

The functions of the embodiments described above may be implemented by at least one processing circuits. As used herein, a "processing circuit" includes a processor programmed to perform each function by software, such as a processor implemented in electronic circuits, an ASIC (Application Specific Integrated Circuit) designed to perform each function as described above, a Digital Signal Processor (DSP), a Field Programmable Gate Array (FPGA), or a conventional circuit module.

Effect of the Invention

This disclosure can provide at least one information processing apparatus capable of setting a role in an application package.

DESCRIPTION OF SYMBOLS

1 Information processing system
10 Electronic apparatus
20 First terminal device
30 Second terminal device
40 Third terminal device
50 At least one information processing apparatus

What is claimed is:

1. At least one information processing apparatus comprising a circuitry that:
   receives, from a terminal device, as a package management unit, a setting of a role, which can assign a usage authority of an application package containing at least one application, with respect to the application package; and
   permits or restricts, as a user management unit, a user to use the application package in conformity with the role, which is allocated to the user of the application, and the role, which is set in the application package,
   wherein the setting of the role, in which the application package can be used, is received, at the terminal device, on a package new creation screen of the application package,
   wherein the role received on the package new creation screen is sent from the terminal device to the at least one information processing apparatus.

2. The at least one information processing apparatus according to claim 1,
   wherein the at least one processing apparatus receives an association between the application package and a tenant which receives a provision of a service using the application package.

3. The at least one information processing apparatus according to claim 2,
wherein the role is a tenant manager having a function of managing the tenant or an ordinary user.

4. The at least one information processing apparatus according to claim 3,
wherein the circuitry authenticates, as an authentication unit, a person authorized to set the role in the application package, and
wherein the authentication unit does not permit the tenant manager or the ordinary user to set the role in the application package.

5. The at least one information processing apparatus according to claim 1,
wherein the user management unit:
registers user information and receives a roll in the registration of the user information; and
sets the usage authority of the application package, in which the same role as that of the role received at the time of registration of the user information is set, to the user information.

6. The at least one information processing apparatus according to claim 1,
wherein the user management unit:
receives registration of the application package to user information; and
provides a screen displaying while associating a list of the application package, in which the same role as the role registered in the user information is set, with each user, and
wherein the registration of the application package to the user information is received on the screen.

7. An information processing system in which a terminal device and at least one information processing apparatus communicate via a network,
wherein the terminal device comprises a circuitry that
receives, as an operation reception unit, a setting of a role, in which an application package can be used on a package new creation screen of the application package including at least one application, and
sends, as a communication unit, the role received by the operation reception unit to the at least one information processing apparatus,
wherein the at least one information processing apparatus comprises another circuitry that
receives, as a package management unit, the setting of the role, which can assign a usage authority of the application package containing at least one application, with respect to the application package, and
permits or restricts, as a user management unit, a user to use the application package in conformity with the role, which is allocated to the user of the application, and the role, which is set in the application package.

8. The information processing system according to claim 7,
wherein, at a time of registration of user information, the user management unit provides screen information of a package list screen including an application package list screen having a same role as the role registered in the user information to the terminal device, and
wherein the terminal device displays the package list screen and requests the registration of the application package that receives the selection displayed on the package list screen into the user information.

9. The information processing system according to claim 7,
wherein the user management unit registers user information,
wherein, after the user information is registered, the user management unit provides the terminal device with screen information on a usage authority management screen in which an application package list having a same role as that of the role registered in user information is associated with each user, and
wherein the terminal device displays the usage authority management screen and requests the at least one information processing apparatus to register the application package with the user information to allocate the usage authority.

10. The information processing system according to claim 7,
wherein, in the at least one information processing apparatus, the another circuitry
provides a tenant list screen and an application package list screen of a tenant receiving a service provided by the application package to the terminal device,
displays, using the terminal device, the tenant list screen and receives a selection of the tenant on the tenant list screen,
displays the application package list screen and receives a selection of the application package on the application package list screen, and
requires the at least one information processing apparatus to cause the selected application package to be associated with the tenant.

11. The information processing system according to claim 10,
wherein the application package list screen is of a non-introduction package list screen that is not associated with the tenant, and
wherein the terminal device receives a selection of the application package from the non-introduction package list screen that is not associated with the tenant.

12. The information processing system according to claim 10,
wherein the another circuitry of the at least one information processing apparatus provides screen information of a tenant information screen including the application package associated with the tenant is provided to the terminal device,
wherein the terminal device displays the tenant information screen and receives the selection of the application package,
wherein the at least one information processing apparatus provides the screen information of the application list screen included in the application package on which the selection is received on the application package list screen, and
wherein the terminal device displays the application list screen and accepts editing of the application included in the application package.

13. The information processing system according to claim 12,
wherein each application included in the application package
receives via the terminal device the setting of the role by which the application is usable, and
receives, in a case where the role has already been set in the application package including the at least one application when the setting of the usable role of the at least one application is received, a selection is made to cancel the role of the application package, wherein, in a case where the application package is released from role, the application is continuously set to the usable role, and wherein, in a case where the application package is not released from the role, the setting of the usable role which is usable the application is not received.

14. A role setting method performed by a terminal device and at least one information processing apparatus, the role setting method comprising:

receiving, with the terminal device, as an operation reception unit, a setting of a role, in which an application package can be used on a package new creation screen of the application package including at least one application;

sending, from the terminal device to the at least one information processing apparatus, the role received by the operation reception unit;

receiving with the at least one information processing apparatus, the setting of the role, which can assign a usage authority of an application package containing at least one application, with respect to the application package; and permitting or restricting, with the at least one information processing apparatus, a user to use the application package in conformity with the role, which is allocated to the user of the application, and the role, which is set in the application package.

* * * * *